(12) United States Patent
Sathyanathan et al.

(10) Patent No.: US 10,409,574 B2
(45) Date of Patent: *Sep. 10, 2019

(54) INCREMENTAL WHOLE PROGRAM COMPILATION OF CODE

(71) Applicant: Microsoft Technology Licensing, LLC, Redmond, WA (US)

(72) Inventors: Patrick W. Sathyanathan, Bellevue, WA (US); Ten H. Tzen, Sammamish, WA (US); Wenlei He, Bellevue, WA (US); Ankit Asthana, Redmond, WA (US); Adrian Militaru, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/209,168

(22) Filed: Jul. 13, 2016

(65) Prior Publication Data
US 2017/0031666 A1 Feb. 2, 2017

Related U.S. Application Data

(63) Continuation of application No. 14/315,158, filed on Jun. 25, 2014, now Pat. No. 9,442,707.

(51) Int. Cl.
*G06F 9/44* (2018.01)
*G06F 9/445* (2018.01)
(Continued)

(52) U.S. Cl.
CPC ................ *G06F 8/48* (2013.01); *G06F 8/41* (2013.01); *G06F 8/447* (2013.01); *G06F 8/443* (2013.01); *G06F 8/52* (2013.01)

(58) Field of Classification Search
CPC ...... G06F 8/41; G06F 8/47; G06F 8/48; G06F 8/52; G06F 8/71; G06F 8/443;
(Continued)

(56) References Cited

U.S. PATENT DOCUMENTS 5,170,465 A 12/1992 McKeeman et al.
5,193,191 A 3/1993 McKeeman et al.
(Continued)

FOREIGN PATENT DOCUMENTS

CN 101034361 A 9/2007
CN 101286119 A 10/2008
EP 856788 A2 5/1998

OTHER PUBLICATIONS

Miranda et al., ERBIUM: A deterministic, concurrent intermediate representation for portable and scalable performance, 2 pages (Year: 2010).*

(Continued)

*Primary Examiner* — Thuy Dao
(74) *Attorney, Agent, or Firm* — Fiala & Weaver P.L.L.C

(57) ABSTRACT

Methods, systems, and computer program products are provided that enable incremental compilation of source code. Attributes of an intermediate language (IL) representation and a compiled representation of a source code are stored. Modified source code that is a revised version of the first source code is received. An IL representation of the modified source code is generated. Attributes of the revised intermediate IL and the stored attributes of the IL representation are compared to determine a first set of functions changed in the modified source code. A second set of functions in the first source code is determined that includes functions affected the determined first set of functions. The first and second sets of functions are compiled to generate a set of compiled functions. Compiled versions of the first and
(Continued)

second sets are replaced in the compiled representation of the first source code with the set of compiled functions.

20 Claims, 9 Drawing Sheets

(51) Int. Cl.
*G06F 9/455* (2018.01)
*G06F 8/41* (2018.01)
*G06F 8/52* (2018.01)

(58) Field of Classification Search
CPC .......... G06F 8/447; G06F 8/433; G06F 8/437; G06F 8/30; G06F 8/74
See application file for complete search history.

(56) References Cited

U.S. PATENT DOCUMENTS

| | | | |
|---|---|---|---|
| 5,204,960 A | 4/1993 | Smith et al. | |
| 5,396,627 A | 3/1995 | Iitsuka | |
| 5,485,616 A | 1/1996 | Burke et al. | |
| 5,758,160 A | 5/1998 | McInerney et al. | |
| 5,812,855 A | 9/1998 | Hiranandani et al. | |
| 5,848,274 A | 12/1998 | Hamby et al. | |
| 6,091,896 A | 7/2000 | Curreri et al. | |
| 6,182,281 B1 | 1/2001 | Nackman et al. | |
| 6,219,834 B1 | 4/2001 | Soroker et al. | |
| 6,738,967 B1* | 5/2004 | Radigan | G06F 8/47 717/146 |
| 7,454,745 B2* | 11/2008 | Aridor | G06F 8/71 707/999.202 |
| 7,516,441 B2 | 4/2009 | Hamilton et al. | |
| 7,721,272 B2 | 5/2010 | Mockford | |
| 7,797,689 B2* | 9/2010 | Mockford | G06F 8/71 717/120 |
| 8,365,156 B2* | 1/2013 | Sollich | G06F 8/44 717/143 |
| 8,375,373 B2 | 2/2013 | Sollich | |
| 8,464,207 B2* | 6/2013 | Pouliot | G06F 8/71 717/101 |
| 8,473,928 B2 | 6/2013 | Park et al. | |
| 8,539,463 B2* | 9/2013 | De | G06F 9/4552 717/146 |
| 8,572,477 B1* | 10/2013 | Moskovitz | G06F 17/30893 715/200 |
| 8,631,395 B2 | 1/2014 | Sathyanathan et al. | |
| 8,671,397 B2 | 3/2014 | Kalman et al. | |
| 8,683,449 B2 | 3/2014 | Singh et al. | |
| 8,739,137 B2 | 5/2014 | Siskind et al. | |
| 8,789,027 B2* | 7/2014 | Rioux | G06F 8/427 717/143 |
| 8,806,463 B1 | 8/2014 | Li et al. | |
| 8,959,495 B2* | 2/2015 | Chafi | G06F 8/443 717/140 |
| 8,966,463 B2 | 2/2015 | Sathyanathan et al. | |
| 8,984,485 B2 | 3/2015 | Elshishiny et al. | |
| 9,182,955 B1* | 11/2015 | He | G06F 8/4435 |
| 9,244,679 B1* | 1/2016 | Arellano | G06F 8/71 |
| 9,317,265 B2* | 4/2016 | Adl-Tabatabai | G06F 8/4441 |
| 9,740,464 B2* | 8/2017 | Munshi | G06F 8/47 |
| 10,152,312 B2* | 12/2018 | Grover | G06F 9/4552 |
| 2003/0005421 A1 | 1/2003 | Prakash et al. | |
| 2005/0028143 A1* | 2/2005 | Aridor | G06F 8/71 717/122 |
| 2005/0034109 A1 | 2/2005 | Hamilton et al. | |
| 2006/0168565 A1 | 7/2006 | Gamma et al. | |
| 2006/0230070 A1 | 10/2006 | Colton et al. | |
| 2006/0253508 A1 | 11/2006 | Colton et al. | |
| 2007/0226700 A1 | 9/2007 | Gal et al. | |
| 2009/0100410 A1* | 4/2009 | Pouliot | G06F 8/75 717/122 |
| 2009/0113396 A1 | 4/2009 | Rosen et al. | |
| 2009/0313600 A1 | 12/2009 | Ayers et al. | |
| 2010/0128866 A1 | 5/2010 | Irun-Briz et al. | |
| 2010/0211924 A1* | 8/2010 | Begel | G06F 8/74 717/101 |
| 2010/0325608 A1 | 12/2010 | Radigan | |
| 2011/0184990 A1 | 7/2011 | Murphy et al. | |
| 2011/0239195 A1 | 9/2011 | Lin et al. | |
| 2011/0271261 A1 | 11/2011 | Kantamneni et al. | |
| 2012/0079447 A1 | 3/2012 | Arnott et al. | |
| 2012/0227034 A1* | 9/2012 | Ibarra | G06F 8/71 717/145 |
| 2013/0031536 A1 | 1/2013 | De et al. | |
| 2013/0074052 A1 | 3/2013 | Adams et al. | |
| 2013/0212567 A1* | 8/2013 | Fisher | G06F 8/41 717/140 |
| 2013/0262421 A1* | 10/2013 | Ferguson | H04L 9/0643 707/698 |
| 2013/0326318 A1* | 12/2013 | Haswell | G06F 11/1004 714/807 |
| 2014/0109106 A1* | 4/2014 | Fanning | G06F 8/433 718/106 |
| 2014/0123108 A1 | 5/2014 | Cheluvaraju et al. | |
| 2014/0282384 A1 | 9/2014 | Pamer | |
| 2014/0306964 A1 | 10/2014 | Reddish et al. | |
| 2014/0317607 A1 | 10/2014 | Adl-Tabatabai et al. | |
| 2015/0040105 A1 | 2/2015 | Abadi et al. | |
| 2015/0040110 A1 | 2/2015 | Adl-Tabatabai et al. | |
| 2015/0067635 A1 | 3/2015 | Chen et al. | |
| 2015/0074655 A1 | 3/2015 | de Lima Ottoni et al. | |
| 2015/0113513 A1 | 4/2015 | Aggag et al. | |
| 2015/0199187 A1 | 7/2015 | Hausner et al. | |
| 2015/0378871 A1 | 12/2015 | Asthana et al. | |
| 2016/0048376 A1* | 2/2016 | Charupally | G06F 8/41 717/158 |
| 2016/0170724 A1* | 6/2016 | Mahaffey | G06F 8/315 717/151 |
| 2016/0357530 A1* | 12/2016 | Cheng | G06F 8/47 |

OTHER PUBLICATIONS

Anand et al., A compiler-level intermediate representation based binary analysis and rewriting system, 14 pages (Year: 2013).*

Burke, et al., A Critical Analysis of Incremental Iterative Data Flow Analysis Algorithms, In Journal of IEEE Transactions on Software Engineering, vol. 16, Issue 7, Jul. 1990, pp. 723-728.

Pozza, et al., A Lightweight Security Analyzer inside GCC, In Proceedings of Third International Conference on Availability, Reliability and Security, Mar. 4, 2008, pp. 851-858.

Sreedhar, et al., "A New Framework for Exhaustive and Incremental Data Flow Analysis Using DJ Graphs", In Proceedings of ACM SIGPLAN Conference on Programming Language Design and Implementation, May 1, 1996, pp. 278-290.

Liang, et al., "An Incremental Compilation Algorithm for the Java Programming Language", In 7th International Conference on Computer Science & Education, Jul. 14, 2012, 4 Pages.

Burke, Michael, "An Interval-Based Approach to Exhaustive and Incremental Interprocedural Data-Flow Analysis", In Journal of ACM Transactions on Programming Languages and Systems, vol. 12, Issue 3, Jul. 1990, pp. 341-395.

Firth, Andy, "Code Build Optimisation Part 4—Incremental Linking and the Search for the Holy Grail", Retrieved From <<http://altdevblog.com/2011/12/26/code-build-optimisation-part-4-incremental-linking-and-the-search-for-the-holy-grail/>> Jan. 3, 2012, 6 Pages.

Tok, et al., "Efficient Flow-Sensitive Interprocedural Data-Flow Analysis in the Presence of Pointers", In Proceedings of 15th International Conference on Compiler Construction, Mar. 30, 2006, pp. 17-31.

Carini, et al., "Flow-Sensitive Interprocedural Constant Propagation", In Proceedings of the ACM SIGPLAN Conference on Programming Language Design and Implementation, Jun. 19, 1995, 9 Pages.

Chambers, et al., "Frameworks for Intra- and Interprocedural Dataflow Analysis", In Technical Report, Nov. 1996, 22 Pages.

Conway, et al., "Incremental Algorithms for Inter-procedural Analysis of Safety Properties", In Proceedings of 17th International Conference on Computer Aided Verification, Jul. 6, 2005, 13 Pages.

(56) References Cited

OTHER PUBLICATIONS

Lin, et al., "Incremental Call Graph Reanalysis for AspectJ Software", In Proceedings of IEEE International Conference on Software Maintenance, Sep. 20, 2009, pp. 306-315.
Pires, Carvalho Miguel, "Incremental Compilation and Deployment for OutSystems Platforms", In FCT NOVA (Faculty of Science and Technology), Feb. 2014, 64 Pages.
Pollock, et al., "Incremental Global Optimization for Faster Recompilations", In International Conference on Computer Languages, Mar. 12, 1990, pp. 281-290.
Krajca, Petr, "Incremental JIT Compiler for Implicitly Parallel Functional Language", In Proceedings of the Federated Conference on Computer Science and Information Systems, Sep. 2013, 8 Pages.
Bernstein, et al., "Incremental Mapping Compilation in an Object-to-Relational Mapping System", In ACM SIGMOD Conference on Management of Data, Jun. 22, 2013, 12 Pages.
"International Preliminary Report on Patentability Issued in PCT Application No. PCT/US2015/037046", dated May 31, 2016, 7 Pages.
"International Search Report & Written Opinion Issued in PCT Application No. PCT/US2015/037046", dated Oct. 13, 2015, 10 Pages.
Reps, et al., "Interprocedural Dataflow Analysis via Graph Reachability", In Proceedings of the Conference Record of the Twenty-Second ACM Symposium on Principles of Programming Languages, Jan. 30, 2015, 51 pages.
"Non-Final Rejection Issued in U.S. Appl. No. 14/315,158", dated Aug. 13, 2015, 27 Pages.
"Note to self: Visual Studio Link Time Code Generation Mostly Buggy", Retrieved From <<https://mostlybuggy.wordpress.com/2012/05/06/note-to-self-visual-studio-link-time-code-generation/>> May 6, 2012, 2 pages.
"Notice of Allowance Received in U.S. Appl. No. 14/315,158", dated Dec. 23, 2015, 17 Pages.
"Notice of Allowance Received in U.S. Appl. No. 14/315,158", dated Apr. 11, 2016, 9 Pages.
"Recode Deoptimize", Retrieved From <<https://www.indefiant.com/recode/help/deoptimize.html>> Jun. 25, 2014, 2 Pages.
"Second Written Opinion Issued in PCT Application No. PCT/US2015/037046", dated Feb. 15, 2016, 4 Pages.
Asthana, Ankit, "Speeding up the Incremental Developer Build Scenario", Retrieved From <<https://blogs.msdn.microsoft.com/vcblog/2014/11/12/speeding-up-the-incremental-developer-build-scenario/>>, Nov. 12, 2014, 11 Pages.
Biggs, Michael, "Statik: An Incremental Compiler Generator", In International Conference on Systems, Programming, Languages and Applications: Software for Humanity, Oct. 25, 2015, pp. 44-45.
Korpi, et al., "Supporting Impact Analysis by Program Dependence Graph Based Forward Slicing", In Advances and Innovations in Systems, Computing Sciences and Software Engineering, Jan. 2007, pp. 197-202 . . . .
"The Old New Thing: Link-Time Code Generation Invalidates a Lot of Classical Assumptions about Linking", Retrieved From <<https://blogs.msdn.microsoft.com/oldnewthing/20140606-00/?p=793>>, Jun. 6, 2014, 1 page.
"What are the pros + cons of Link-Time Code Generation? (VS 2005)", Retrieved from <<http://stackoverflow.com/questions/288691/what-are-the-pros-cons-of-link-time-code-generation-vs-2005>>, Nov. 13, 2008, 2 Pages.
"Office Action Issued in Chinese Patent Application No. 201580033415.1", dated Dec. 29, 2018, 13 Pages.

\* cited by examiner

INCREMENTAL WHOLE PROGRAM COMPILATION OF CODE

CROSS REFERENCE TO RELATED APPLICATION

This application is a continuation of U.S. application Ser. No. 14/315,158, filed on Jun. 25, 2014, titled "Incremental Whole Program Compilation of Code," now U.S. Pat. No. 9,442,707, which is incorporated by reference herein in its entirety.

BACKGROUND

Various types of development applications exist that software developers may use to develop software. An integrated development environment (IDE) is a type of software development application that contains several development tools in one package. An IDE may include tools such as a source code editor, a build automation tool, and a debugger. Examples of IDEs include Eclipse™ developed by Eclipse Foundation of Ottawa, Canada, ActiveState Komodo™ developed by ActiveState of Vancouver, Canada, IntelliJ IDEA developed by JetBrains of the Czech Republic, Oracle JDeveloper™ developed by Oracle Corporation of Redwood City, Calif., NetBeans developed by Oracle Corporation, Codenvy™ developed by Codenvy of San Francisco, Calif., Xcode® developed by Apple Corporation of Cupertino, Calif., and Microsoft® Visual Studio®, developed by Microsoft Corporation of Redmond, Wash.

In a typical software development, a developer may modify a small part of a large application program. The developer may rebuild (e.g., recompile and link) the modified application in a release mode so that the developer can test the change. A release mode build typically uses whole program optimizations where the entire application is analyzed and inter-procedural information is used to generate machine code which is highly performant. Currently, many compilers, such as C/C++ compilers, when performing such whole program optimizations, have to recompile all the functions in an application even if only one or a few of the functions have been modified. Having to rebuild an entire application even when minor changes are made to the application leads to long build times that adversely affect developer productivity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable incremental compilation of source code. Instead of recompiling modified source code in its entirety, a portion of the modified source code is compiled. The portion of the modified source code that is compiled is a portion of the modified source code that was affected by the edits made to the source code, either directly or indirectly. For instance, variables and/or functions in the source code that were modified may be compiled. Furthermore, portions of the source code that were affected by the modified variables and/or functions may be determined and compiled. The functions that are indirectly affected by an edit are those whose code was generated using information flowing from the edited functions and variables. This is a consequence of using inter-procedural information to optimize the code generated for those functions. The re-compiled portion of the source code may be inserted in a fully compiled version of the source code to replace the modified and/or affected functions. In this manner, a compiled version of the modified source code is generated without having to recompile the modified source code in its entirety.

In one example method implementation, one or more attributes determined from the intermediate language representation of functions and variables in a first source code, and a compiled representation of the first source code, are stored. Modified source code that is a revised version of the first source code is received. An intermediate language representation of the modified source code is generated (as a "revised" intermediate language representation). The stored intermediate language attributes and attributes determined from the revised intermediate language representation are compared to determine a first set of functions changed in the modified source code relative to the first source code. A second set of functions in the first source code is determined that includes functions affected by one or more functions in the determined first set of functions. The first set of functions and the second set of functions are compiled to generate a set of compiled functions. Compiled versions of the first and second sets of functions are replaced in the compiled representation of the first source code with the set of compiled functions to generate a compiled representation of the modified source code.

Note that attributes of the revised intermediate language representation and the stored attributes of the intermediate language representation may also be compared to determine any variables changed in the modified source code relative to the first source code. The second set of functions may include any functions in the first source code affected by at least one of a function in the determined first set of functions or a variable determined to have changed.

In an example system implementation, a compiler includes a compiler front end and a compiler back end. The compiler front end is configured to generate intermediate language representations of received source code files, including being configured to generate an intermediate language representation of a first source code and of a modified source code that is a revised version of the first source code. The compiler back end is configured to generate compiled representations of the intermediate language representations of the received source codes files, including being configured to generate a compiled representation of the first source code and of the intermediate language representation of the modified source code. The compiler back end includes an incremental compilation enabler configured to perform incremental compilation. The incremental compilation enabler includes a code change determiner, an affected function determiner, and a code assembler. The code change determiner is configured to determine any variables and a first set of functions changed in the modified source code relative to the first source code. The affected function determiner is configured to determine a second set of functions in the first source code affected by any changed variables and/or any functions in the changed first set of functions. The compiler back end is configured to compile the first set of functions and the second set of functions to generate a set of compiled functions. The code assembler is configured to replace compiled versions of the first and second sets of functions in the compiled representation of the first source code with the set of compiled functions to generate a compiled representation of the modified source code.

The compiler may further include a dependence graph generator. The dependence graph generator is configured to generate a dependence graph based on the first source code.

The affected function determiner may include a dependence graph analyzer. The dependence graph analyzer is configured to analyze the dependence graph to determine the second set of functions.

In an implementation, the dependence graph generator may be configured to: associate a node with each variable and with each function of the intermediate language representation of the first source code to designate a plurality of nodes; determine a first set of directed edges, each directed edge of the first set extending from a first function node to a second function node of the dependence graph to indicate that a change in the function associated with the first function node affects the function associated with the second function node; determine a second set of directed edges, each directed edge of the second set extending from a variable node to a third function node of the dependence graph to indicate that a change in the variable associated with the variable node affects the function associated with the third function node; and store a dependence graph that includes the plurality of nodes, the first set of directed edges, and the second set of directed edges.

In an implementation, the dependence graph analyzer may be configured to: traverse directed edges of the first set of directed edges from a node for each function in the determined first set of functions to determine first affected functions; traverse directed edges of the second set of directed edges from a node for each variable determined to have changed in the revised intermediate language representation to determine second affected functions; and generate the second set of functions to include the first affected functions and the second affected functions.

A computer readable storage medium is also disclosed herein having computer program instructions stored therein that enable incremental compilation of source code, according to the embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
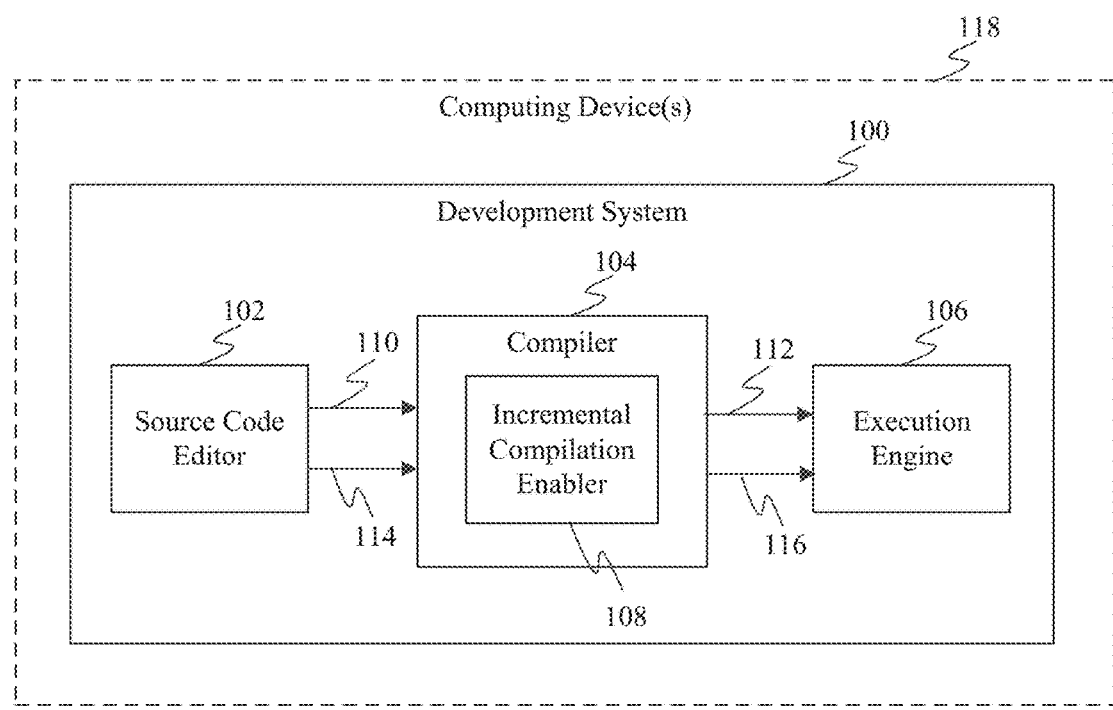
FIG. 1 shows a block diagram of a computing device that includes a compiler configured to perform incremental compilation of source code, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Incremental Compilation

Embodiments described herein enable compilers, including standalone compilers and compilers of integrated development environments (IDE), to perform incremental compilation of program code. A developer (a person who designs program code) is enabled to make modifications/revisions to source code, and instead of the source code being recompiled in its entirety, just portions of the source code that were affected by the modifications/revisions are compiled. As such, incremental compilation of program code reduces build time.

For instance, a subset of functions of the source code that is affected by the modifications may be detected, which may be a relatively small number of the total number of functions of the source code, and just that subset is compiled.

In an embodiment, a database of information generated during the previous source code build (e.g., compiling and linking of the source code) is stored. This stored information may be used in conjunction with the detected code modifications to determine a set of functions whose code is affected by the modifications, even if those functions are not directly modified. The compiled code (e.g., machine code) for unaffected functions may be obtained from the previous build without having to recompile the unaffected functions.

For example, in an embodiment, a graph data structure may be built during a source code built that captures the dependencies that affect the code generated for a function. This graph, which may be referred to as a code generation dependence graph (CGDG) or dependence graph (DG), may include nodes for each global variable and function in the application program. The nodes store attributes of variables and function that affect code generation. A directed edge from a first node to a function node represents that a change in an attribute of the first node affects the code generated for the function associated with the function node.

One or more techniques, such as a checksum technique, may be used to detect which functions have been edited since the previous build. The detected edited functions in combination with the dependence graph generated during a previous build, may be used to detect which functions need to be compiled and which ones do not. Relevant code information determined by a build, including the code information defining a dependence graph, may be written into a database called an incremental program database (IPDB), to be used in the next incremental build.

In one embodiment, an incremental compilation may be performed as follows: 1) Read in the dependence graph generated for the previous build from the IPDB; 2) Construct a dependence graph for the modified input code; 3) Compare variable and function node attributes between the two dependence graphs to detect an initial set of nodes that have changed; 4) Compute all the function nodes reachable from the initial set in the dependence graph of the previous build to determine an affected set of nodes; 5) Recompile the functions associated with the initial set of nodes and the affected set of nodes to generate a modified machine code portion. 6) Copy the machine code for all other functions (other than the functions associated with the initial and affected node sets) from the previous build (e.g., from an object file generated by the previous build), and combine it with the modified machine code portion to generate the rebuilt machine code.

Numerous exemplary embodiments are described in the following sections for performing incremental compilation.

A. Example System and Method Embodiments for Incremental Compilation

Compilers may be configured in various ways to perform incremental compilation, in embodiments. For instance, FIG. 1 shows a block diagram of a development system 100 configured to perform incremental compilation of source code, according to an example embodiment. As shown in FIG. 1, development system 100 includes a source code editor 102, a compiler 104, and an execution engine 106. Furthermore, compiler 104 includes an incremental compilation enabler 108. The features of system 100 are described as follows.

As shown in FIG. 1, development system 100 may be implemented in one or more computing devices 118. For instance, source code editor 102, compiler 104, and execution engine 106 may be included in a same computing device, or one or more of source code editor 102, compiler 104, and execution engine 106 may be implemented in or more computing devices separate from those of others of source code editor 102, compiler 104, and execution engine 106.

Computing device(s) 118 may be any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer).

A developer may interact with source code editor 102 to enter and modify program code when generating source code for an application. For instance, the developer may add, modify, or delete program code text using source code editor 102 such as by typing, by voice input, etc. When complete, or at other intervals, the user may be enabled to save the program code by interacting with a "save" button or other user interface element. Source code editor 102 may be a browser based editor, a code editor integrated in a desktop or mobile application, or any other type of code editor.

For instance, as shown in FIG. 1, a developer may interact with source code editor 102 to generate first source code 110. First source code 110 is a collection of computer instructions (possibly with comments) written using a human-readable computer programming language. Examples of suitable human-readable computer programming languages include C, C++, Java, etc. First source code 110 may be received in one or more files or other form. For instance, first source code 110 may be received as one or more ".c" files (when the C programming language is used), as one or more ".cpp" files (when the C++ programming language is used), etc.

Compiler 104 may be invoked in any manner, such as by a command line, graphical user interface, etc. A "-full" switch, or other switch, may be used when compiler 104 is invoked to perform a full compile. Compiler 104 is configured to receive and compile first source code 110 to generate machine code 112. In particular, compiler 104 is configured to transform source code 112 into machine code 112 in the form of another computer language, typically having a binary form, referred to as machine code or object code. In some cases, compiler 104 may include multiple stages, and may first convert first source code 110 into an intermediate form (e.g., an intermediate language), which is subsequently converted into machine code 112. Machine code 112 may be included in a file (e.g., an object or ".obj" file), or may be created/stored in another form, to form an executable program or application.

As shown in FIG. 1, execution engine 106 may receive machine code 112. Execution engine 106 is configured to execute machine code 112, thereby executing the program/application represented by machine code 112. For instance, execution engine 106 may include one or more processors (e.g., a central processing unit (CPU)), physical and/or virtual, that execute(s) machine code 112.

Note that a developer may cause execution engine 106 to execute machine code 112 by interacting with a user interface, and/or in another manner. The developer may execute machine code 112 in order to test or troubleshoot (e.g., "debug") machine code 112, or more for another reason. The developer may decide to modify first source code 110 due to the results of the execution of machine code 112 and/or for other reason(s). Accordingly, the developer may cause first source code 110 to be loaded by source code editor 102 (e.g., from storage), so that the developer can change one or more variables and/or one or more functions in first source code 110, and source code editor 102 may generate modified source code 114 accordingly. The corresponding program/application represented by the compiled version of modified source code 114 may operate differently than machine code 112, due to the changes.

The developer may make any number of modifications to variables and/or functions in first source code 110 to generate modified source code 114. In any case, the developer may desire compiler 104 to compile modified source code 114 into machine code faster than first source code 110 was originally compiled to generate machine code 112, because just a portion of first source code 110 may be changed in modified source code 114. Faster compilation enhances developer productivity.

Accordingly, as shown in FIG. 1, compiler 104 includes incremental compilation enabler 108. Incremental compilation enabler 108 enables compiler 104 to perform incremental compilation, which is a compilation of portions of source code affected by modifications thereto, rather than a full compilation of the source code, which can take significantly longer.

Figure 2:
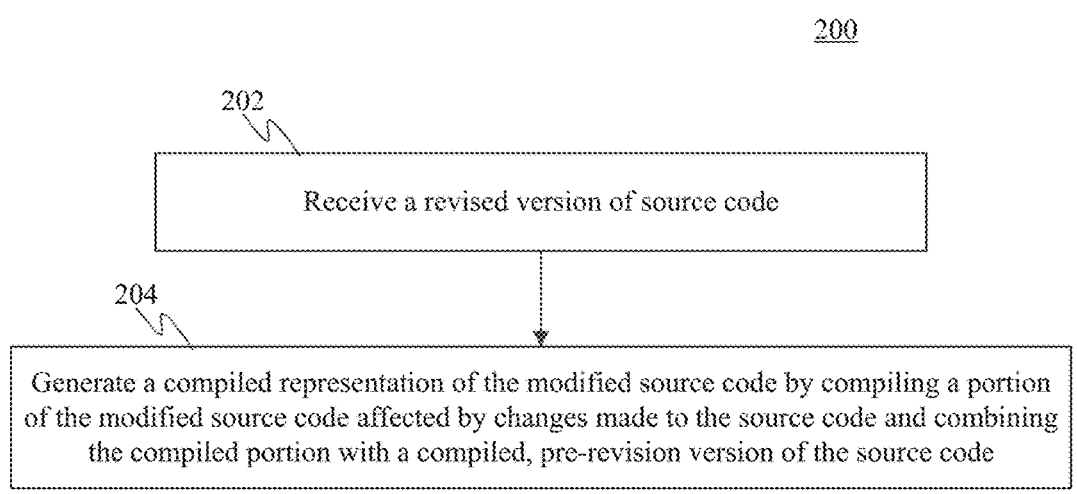
FIG. 2 shows a flowchart providing a process to perform incremental compilation of source code, according to an example embodiment.

Incremental compilation enabler 108 may enable compiler 104 to perform incremental compilation in various ways, in embodiments. For instance, in an embodiment, compiler 104 may operate according to FIG. 2. FIG. 2 shows a flowchart 200 providing a process to perform incremental compilation of source code, according to an example embodiment. Flowchart 200 is described as follows with respect to FIG. 1. Further structural and operational embodiments will be apparent to persons skilled in the relevant art(s) based on the following description.

Flowchart 200 begins with step 202. In step 202, a revised version of source code is received. For instance, compiler 104 may be invoked in any manner to perform an incremental compile or build, such as by a command line (e.g., with an "-incremental" switch), by a graphical user interface, etc. As shown in FIG. 1, compiler 104 may receive modified source code 114. Modified source code 114 is a modified version of first source code 110 (e.g., one or more variables and/or functions are changed). Modified source code 114 is typically included in one or more files. Modified source code 114 includes one or more code modifications in one or more files that cause modified source code 114 to be different than first source code 110.

In step 204, a compiled representation of the modified source code is generated by compiling a portion of the modified source code affected by changes made to the source code and combining the compiled portion with a compiled, pre-revision version of the source code. In an embodiment, compiler 104 is configured to generate a compiled representation of modified source code 114, as recompiled machine code 116. Furthermore, incremental compilation enabler 108 enables compiler 104 to generate recompiled machine code 116 in an incremental manner, rather than compiling modified source code 114 in its entirety.

For example, in an embodiment, incremental compilation enabler 108 may be configured to determine a first portion of modified source code 114 that contains the modifications (relative to first source code 110), and to determine a second portion of modified source code 114 that is affected by the modifications. In other words, incremental compilation enabler 108 first may determine variables and/or functions in modified source code 114 that were modified by the developer (the first portion). Subsequently, incremental compilation enabler 108 determines functions of modified source code 114 (the second portion) that are affected by the variables and/or functions determined to be modified. The functions of the determined first and second portions are compiled by compiler 104, and inserted in machine code 112 in place of the modified and affected functions, to generate recompiled machine code 116.

Figure 3:
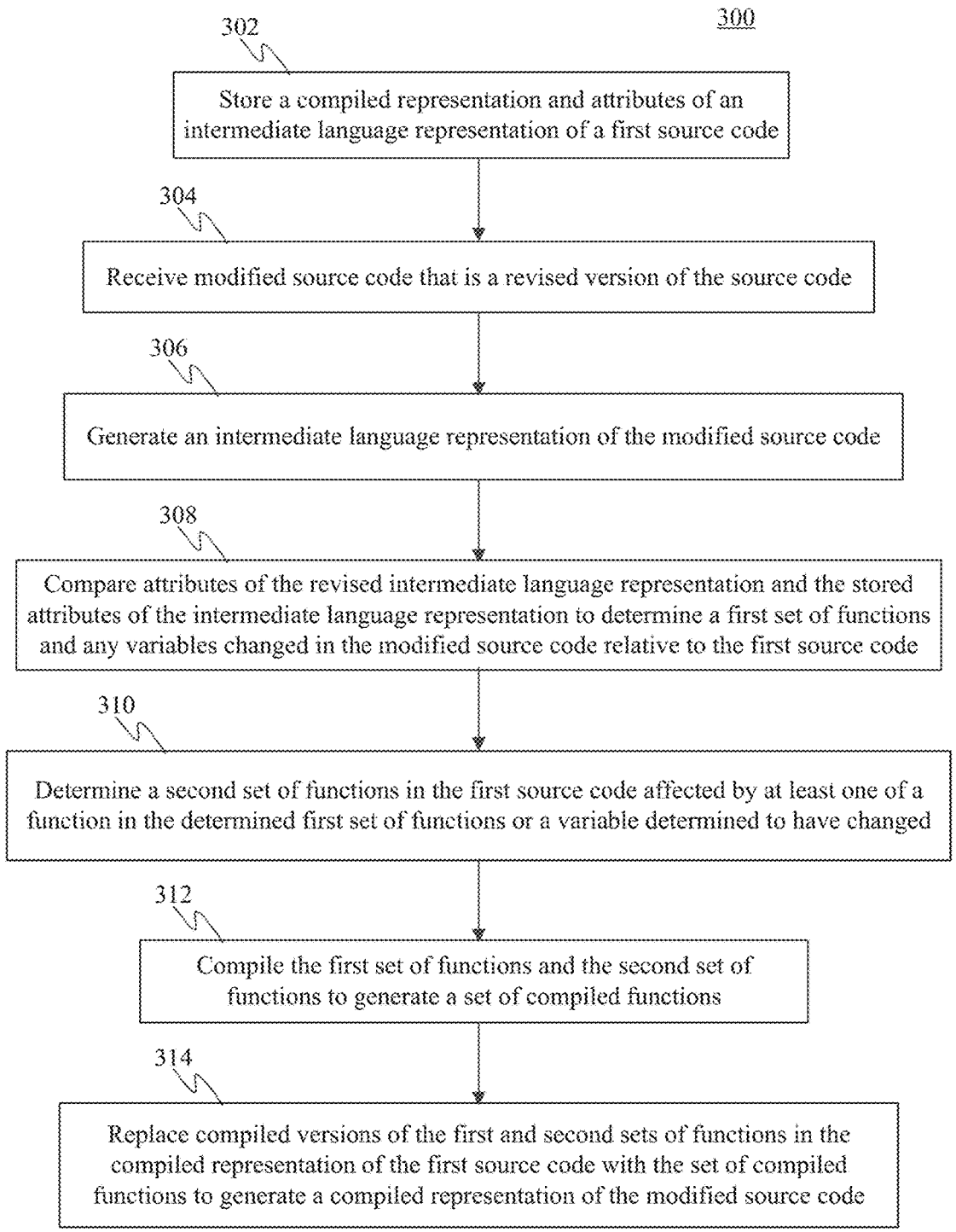
FIG. 3 shows a flowchart providing an example implementation of the flowchart of FIG. 2, according to an embodiment.
Figure 4:
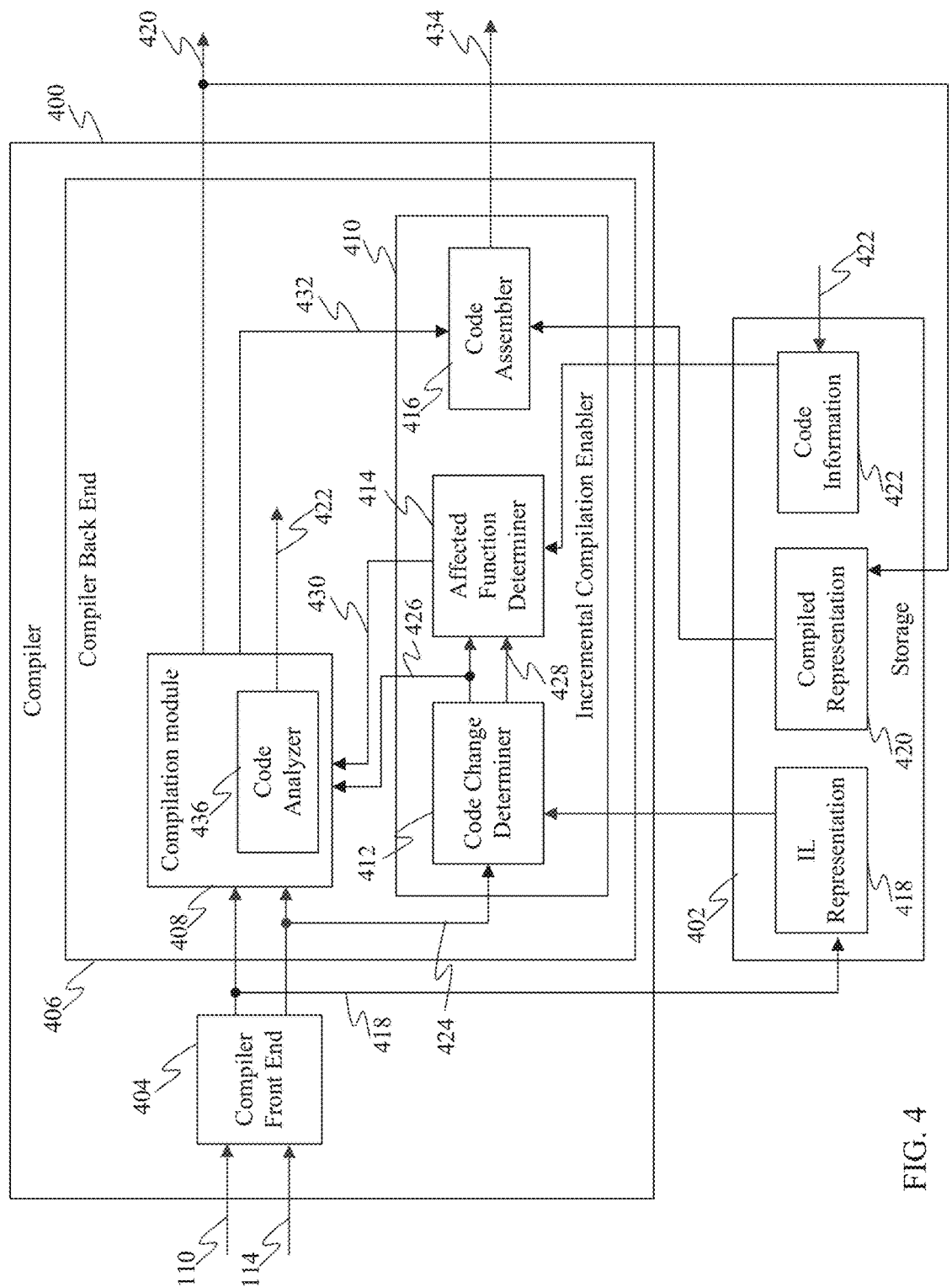
FIG. 4 shows a block diagram of a compiler configured to perform incremental compilation of source code, according to an example embodiment.

Compiler 104 and flowchart 200 may be configured in various ways in embodiments. For instance, FIG. 3 shows a flowchart 300 providing an example process for performing incremental compilation, according to an embodiment. Flowchart 300 of FIG. 3 is an example of flowchart 200 of FIG. 2. Furthermore, FIG. 4 shows a block diagram of a compiler 400 configured to perform incremental compilation of source code, according to an example embodiment. Compiler 400 of FIG. 4 is an example of compiler 104 of FIG. 1. As shown in FIG. 4, compiler 400 is communicatively coupled with storage 402. Furthermore, as shown in FIG. 4, compiler 400 includes a compiler front end 404 and a compiler back end 406. Compiler back end 406 includes a compilation module 408 and an incremental compilation enabler 410. Incremental compilation enabler 410 is an example of incremental compilation enabler 108 of FIG. 1. Incremental compilation enabler 410 includes a code change determiner 412, an affected function determiner 414, and a code assembler 416. Compilation module 408 includes a code analyzer 436.

Compiler 400 is described with respect to flowchart 300 for purposes of illustration. Further structural and operational embodiments will be apparent to persons skilled in the relevant art(s) based on the following description of flowchart 300 and compiler 400. Note that the steps of flowchart 300 do not necessarily have to occur in the order shown, as the order shown is provided for ease of illustration, and not for reasons of limitation.

Flowchart 300 of FIG. 3 begins with step 302. In step 302, a compiled representation and attributes of an intermediate language representation of a first source code are stored. For example, with reference to FIG. 4, compiler front end 404 may receive first source code 110. First source code 110 contains program code written in a programming language, such as a high level programming language (e.g., C, C++, Java, etc.). Compiler front end 404 is configured to generate an intermediate language (IL) representation 418 of received source code, such as first source code 110. Compiler front end 404 may additionally perform optional functions such as verifying syntax and semantics, performing type checking, stripping out comments, etc., to generate IL representation 418.

IL representation 418 generated by compiler front end 404 is an IL version of first source code 110 that includes code-improving transformations relative to a high level programming language used for first source code 110. First source code 110 may be converted into code of any suitable intermediate language by compiler front end 404, including C, Microsoft®'s Common Intermediate Language (CIL), etc. Accordingly, compiler front end 404 may be configured in any manner to convert first source code 110 to IL representation 418, as would be known to persons skilled in the relevant art(s).

Furthermore, as shown in FIG. 4, compiler back end 406 receives IL representation 418. Compiler back end 406 is configured to perform full compilation of received IL code as well as incremental compilation of received IL code. For instance, with respect to IL representation 418, compiler back end 406 uses compilation module 408 to perform full compilation. In particular, compilation module 408 receives IL representation 418, and is configured to compile code of IL representation 418 into compiled representation 420. Compilation module 408 may be configured to compile received IL code into compiled machine code in any manner. Compiled representation 420 is an example of machine code 112 of FIG. 1. Thus, compiled representation 420 is program code that typically has a binary form, referred to as machine code or object code. Compiled representation 420 may be included in a file (e.g., an object file), or may be created/stored in another form, to form an executable program or application that may be executed by one or more processors. For instance, execution engine 106 of FIG. 1 may receive and execute compiled representation 420.

As shown in FIG. 4, IL representation 418 and compiled representation 420 may be stored in storage 402. Storage 402 may include one or more of any type of storage medium/device to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device.

Note that IL representation 418 is optionally stored in storage 402. In an embodiment, alternatively to or in addition to storing IL representation 418 in its entirety in storage 402, attributes of IL representation 418 may be determined and stored in storage 402. The attributes of IL representation 418 may be determined by compiler front end 404 or compiler back end 406 (e.g., by code analyzer 436 and/or code change determiner 412), and stored in code information 422. Examples of attributes of IL representation 418 that may be determined include function attributes that are considered declared (or "source") function attributes and computed function attributes. Declared attributes are attributes that are present in first source code 110, and examples of declared function attributes include dllimport, dllexport, a number of formal parameters, etc. Examples of function attributes that may be computed include a checksum for each function, an indication of whether a function can throw any exceptions, etc. Still further, declared attributes and/or computed attributes may be determined for variables, and stored in code information 422. An example of a computed variable attribute is an indication of whether a variable always has a constant value when executing a function. Further examples of the determination of attributes of IL representation 418 by compiler front end 404 and/or compiler back end 406 are described elsewhere herein.

Referring back to FIG. 3, in step 304, modified source code that is a revised version of the source code is received. For example, as shown in FIG. 4, compiler front end 404 may receive modified source code 114. Modified source code 114 is a modified version of first source code 110 (e.g., attributes of one or more variables and/or functions are changed). Modified source code 114 is typically included in one or more files, and is programmed in the same programming language as first source code 110. Modified source code 114 includes one or more code modifications in one or more files that cause modified source code 114 to be different from first source code 110.

In step 306, an intermediate language representation of the modified source code is generated. For instance, as shown in FIG. 4, compiler front end 404 is configured to generate an IL representation of modified source code 114 referred to herein as revised IL representation 424.

In step 308, attributes of the revised intermediate language representation and the stored attributes of the intermediate language representation are compared to determine a first set of functions and any variables changed in the modified source code relative to the first source code. For example, as shown in FIG. 4, code change determiner 412 of incremental compilation enabler 410 may receive revised IL representation 424. Code change determiner 412 is configured to determine changes that are present in revised IL representation 424 relative to IL representation 418, which indicate changes that were made by a developer in modified source code 114 relative to first source code 110. In particular, code change determiner 412 may be configured to determine modified variables and/or functions in revised IL representation 424.

Figure 5:
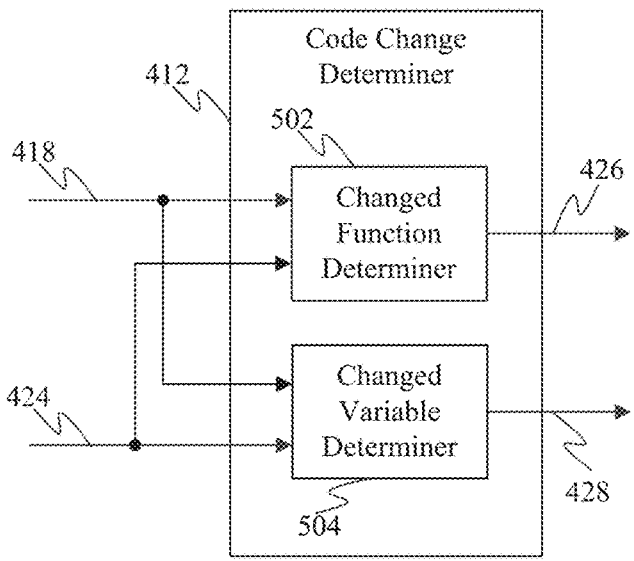
FIG. 5 shows a block diagram of a code change determiner, according to an example embodiment.

For instance, FIG. 5 shows a block diagram of code change determiner 412, according to an example embodiment. As shown in FIG. 5, code change determiner 412 includes a changed function determiner 502 and a changed variable determiner 504. Changed function determiner 502 is configured to compare attributes of the IL code generated from modified source code to attributes of the IL code generated from the source code (prior to modification) to determine any functions that are changed in the modified source code. Changed variable determiner 504 is configured to compare attributes of the IL code generated from modified source code to attributes of the IL code generated from the source code (prior to modification) to determine any variables that are changed in the modified source code. One or both of changed function determiner 502 and changed variable determiner 504 may be present in embodiments, depending on whether changes to functions, to variables, or to both functions and variables are to be searched for.

Figure 6:
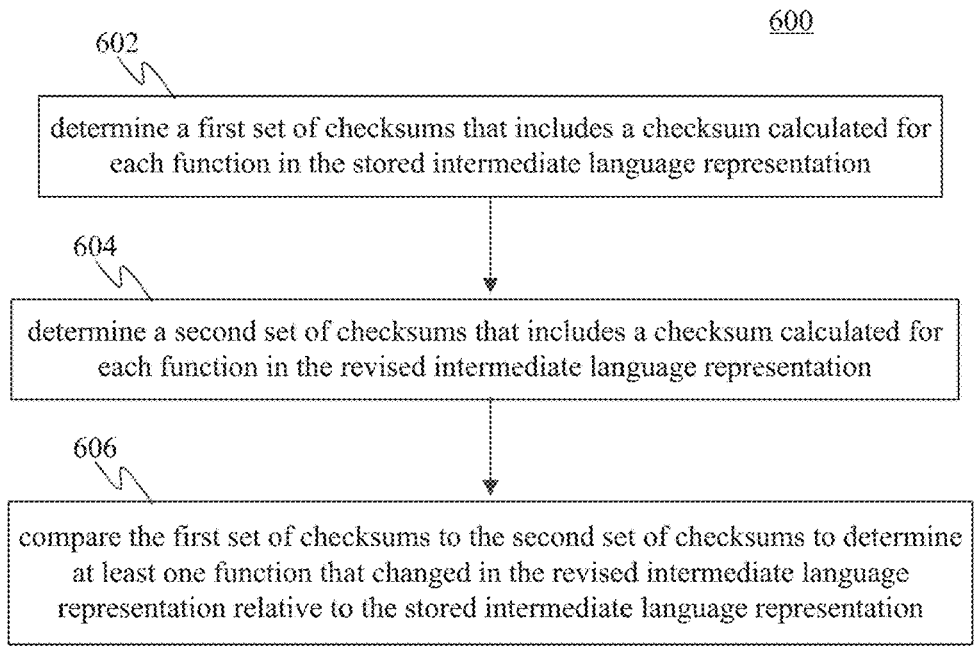
FIG. 6 shows a flowchart providing a process for detecting functions that were modified in source code, according to an example embodiment.

Changed function determiner 502 may detect changed functions in any manner. For instance, FIG. 6 shows a flowchart 600 providing a process for detecting functions that were modified in source code, according to an example embodiment. Changed function determiner 502 may operate according to flowchart 600, in an embodiment. Further structural and operational embodiments will be apparent to persons skilled in the relevant art(s) based on the following description of flowchart 600. Note that the steps of flowchart 600 do not necessarily have to occur in the order shown in FIG. 6.

Flowchart 600 of FIG. 6 begins with step 602. In step 602, a first set of checksums is determined that includes a checksum calculated for each function in the stored intermediate language representation. For example, as shown in FIG. 5, changed function determiner 502 receives IL representation 418. In one embodiment, changed function determiner 502 is configured to determine a checksum for each function in IL representation 418, and include the checksums in a first set. Alternatively, the checksums may be determined by compiler front end 404 or elsewhere. The first set of checksums may be stored in storage 402 (e.g., in code information 422, as described further below), or may be maintained in another manner. Note that changed function determiner 502 may determine the first set of checksums at any time, including at a time at which IL representation 418 is generated, at a time prior to generation of revised IL representation 424, or at a time after revised IL representation 424 is generated.

In step 604, a second set of checksums is determined that includes a checksum calculated for each function in the revised intermediate language representation. As shown in FIG. 5, changed function determiner 502 receives revised IL representation 424. Changed function determiner 502 is configured to determine a checksum for each function in revised IL representation 424, and include the checksums in a second set. Alternatively, the checksums may be determined by compiler front end 404 or elsewhere. The second set of checksums may be maintained in any manner.

Note that changed function determiner 502 may determine the checksums in steps 602 and 604 in any manner. For example, in an embodiment, a checksum of a function may be determined by calculating the checksum of each tuple of the function and combining the checksums in any manner (e.g., by addition, etc.). The checksum of instruction tuples may be calculated based on the checksum of each source and destination tuple as well as the instruction opcode itself. In other embodiments, code change determiner 602 may determine checksums for functions in other ways.

In step 606, the first set of checksums is compared to the second set of checksums to determine at least one function that changed in the revised intermediate language representation relative to the stored intermediate language representation. In an embodiment, changed function determiner 502 is configured to compare the first set of checksums to the second set of checksums. If any functions were modified or deleted, and/or any new functions were added (in modified source code 114 relative to first source code 110), these differences would be reflected in the comparison of the first and second sets of checksums.

For instance, if a function were modified (e.g., a function whose source has been edited, etc.) its checksum would be different in the second set relative to the first set. This would indicate a modified function. If a function was deleted, a checksum for the function would be present in the first set, but not in the second set. If a function was added, a checksum for the function would not be present in the first set, but would be present in the second set. Accordingly, by comparing the checksums of the first and second sets, changed function determiner 502 can determine any function changes (modifications, deletions, additions). The functions determined to be changed are indicated in first set of functions 426 shown in FIGS. 4 and 5, are included in the first set of functions determined in step 308 of flowchart 300 (FIG. 3).

Figure 7:
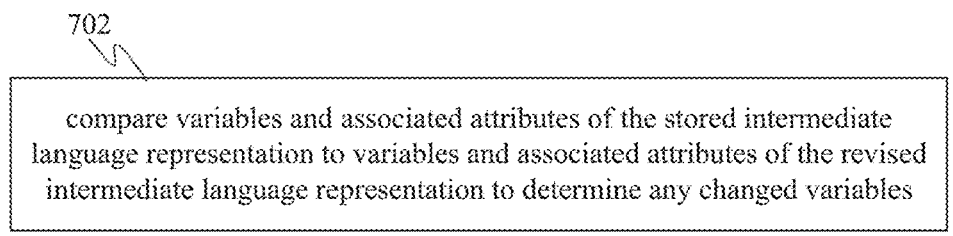
FIG. 7 shows a process for detecting variables that were modified in source code, according to an example embodiment.

Changed variable determiner 504 may detect changed variables in any manner. For instance, FIG. 7 shows a step 702 for detecting variables that were modified in source code, according to an example embodiment. In step 702, variables and associated attributes of the stored intermediate language representation are compared to variables and associated attributes of the revised intermediate language representation to determine any changed variables. For example, as shown in FIG. 5, changed variable determiner 504 receives IL representation 418 (or code information 422) and revised IL representation 424. Changed variable determiner 504 is configured to compare any variables declared in IL representation 418, or maintained in code information 422 (as determined from IL representation 418), to any variables declared in revised IL representation 424 to determine any changed variables. For instance, if any variables were modified or deleted, and/or any new functions were added (in modified source code 114 relative to first source code 110), these differences would be reflected in the comparison of the variables of IL representation 418 (or code information 422) and revised IL representation 424.

For instance, if a variable were modified (e.g., a value of a declared or calculated attribute of the variable was changed, a new attribute was added to the variable, an attribute was removed from the variable, etc.), this difference is apparent when the variable is compared between IL representation 418 (or code information 422) and revised IL representation 424. This would indicate a modified variable. If a variable was deleted, the variable would be present in IL representation 418 (or code information 422), but not in revised IL representation 424. If a variable was added, the variable would not be present in IL representation 418 (or code information 422), but would be present in revised IL representation 424. Accordingly, by comparing the variables of the IL representation 418 (or code information 422) and revised IL representation 424, changed variable determiner 504 can determine any variable changes. The variables determined to be changed are indicated in changed variables 428 shown in FIGS. 4 and 5.

Note that the variables analyzed in step 702 may be global variables. A global variable is a variable with global scope, such that it is visible (hence accessible) throughout source code, even when the source code is composed of multiple linked files. In such case, the global variable has a same structure (e.g., the same attribute(s)) and value throughout the source code (e.g., first source code 110 or modified source code 114).

Referring back to FIG. 3, in step 310 of flowchart 300, a second set of functions in the first source code is determined that includes functions affected by at least one of a function in the determined first set of functions or a variable determined to have changed. In an embodiment, as shown in FIG. 4, affected function determiner 414 of incremental compilation enabler 410 may receive first set of functions 426 and changed variables 428. First set of functions 426 includes the first set of functions determined by code change determiner 412 to be changed, and may indicate any number of changed functions, including zero, or numbers of changed functions in the tens, hundreds, thousands, etc. Changed variables 428 includes any variables determined by code change determiner 412 to be changed, and may indicate any number of changed variables, including zero changed variables, or numbers of changed variables in the ones, tens, hundreds, thousands, etc.

Furthermore, affected function determiner 414 receives code information 422, which includes information (e.g., attributes) about first source code 110 obtained from IL representation 418. In particular, code information 422 may be analyzed to determine functions of IL representation 418 (and thereby, of first source code 110) that are affected by changed functions and/or variables. As shown in FIG. 4, code information 422 may be generated by code analyzer

436. Code analyzer 436 may generate code information 422 to include function attributes and variable attributes based on IL representation 418 in any manner described herein. As shown in FIG. 4, code information 422 may be stored in storage 402 (e.g., in the form of one or more files, a database, and/or any other data structure). Code information 422 may be generated in any manner, and to have any form, by code analyzer 436. For instance, in an embodiment, code analyzer 436 may generate code information 422 to include data to support a dependence graph. The dependence graph indicates functions and variables, and dependencies between them.

Figure 8:
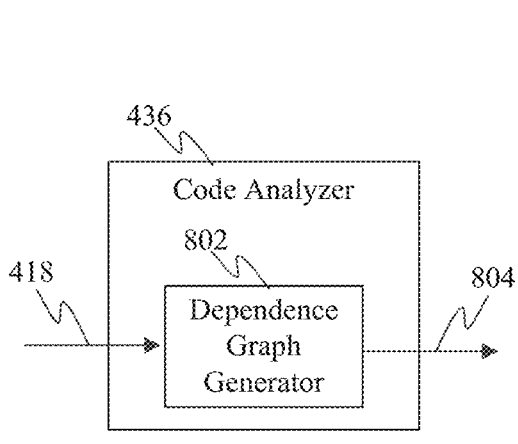
FIG. 8 shows a block diagram of a code analyzer configured to generate a dependence graph, according to an example embodiment.

For instance, FIG. 8 shows a block diagram of code analyzer 436, according to an example embodiment. As shown in FIG. 8, code analyzer 436 includes a dependence graph generator 802. Dependence graph generator 802 is configured to generate a dependence graph 804 that includes data that represents dependencies between functions and variables of IL representation 418. These dependencies may be traversed to determine other functions affected by code changes present in modified source code 114.

Figure 10:
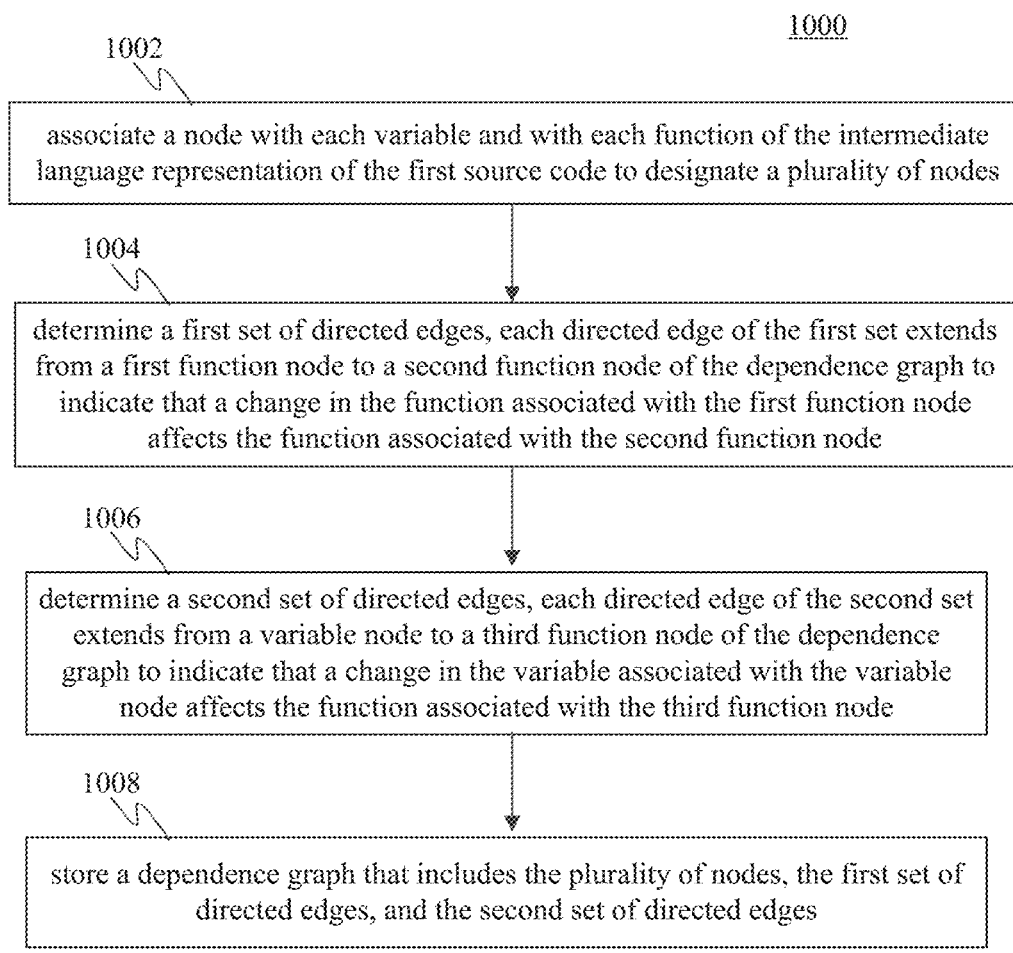
FIG. 10 shows a flowchart providing a process for generating a dependence graph, according to an example embodiment.

Dependence graph generator 802 may operate in any manner to perform its functions. For instance, FIG. 10 shows a flowchart 1000 providing a process for generating a dependence graph, according to an example embodiment. In an embodiment, dependence graph generator 802 may operate according to flowchart 1000. Dependence graph generator 802 is described with respect to flowchart 1000 for purposes of illustration. Further structural and operational embodiments will be apparent to persons skilled in the relevant art(s) based on the following description of flowchart 1000 and dependence graph generator 802. Note that the steps of flowchart 1000 do not necessarily have to occur in the order shown.

Flowchart 1000 of FIG. 10 begins with step 1002. In step 1002, a node is associated with each variable and with each function of the intermediate language representation of the first source code to designate a plurality of nodes. In an embodiment, dependence graph generator 802 parses IL representation 418 for all functions. Dependence graph generator 802 may identify a function in IL representation 418 in any manner, including by identifying the declaration of a function (e.g., a function name followed by "()"), identifying the body of a function (e.g., enclosed in bracket symbols "{", "}"), and/or by identifying other parts of a function. Dependence graph generator 802 may identify a global variable in IL representation 418 in any manner, including by identifying the declaration of a global variable (e.g., "extern int globalvariable=1;"), etc. Dependence graph generator 802 is configured to identify each function and each variable with a corresponding node (e.g., with a node identifier) in dependence graph 804.

In step 1004, a first set of directed edges is determined, each directed edge of the first set extends from a first function node to a second function node of the dependence graph to indicate that a change in the function associated with the first function node affects the function associated with the second function node. In an embodiment, dependence graph generator 802 analyzes IL representation 418 to determine dependencies between functions. For instance, dependence graph generator 802 may determine when a first function (callee function) is called by a second function (caller function), such that changes in the first function affect the second function. Thus, dependence graph generator 802 may be configured to parse the structure of each function in IL representation 418 to determine what other function(s) the function calls, if any. Dependence graph generator 802 is configured to identify each function call as a "directed edge" (e.g., with an edge identifier) in dependence graph 804. Each directed edge identifies a first function node and a second function node, to indicate that the function associated with the second function node is dependent on (e.g., calls) the function associated with the first function node.

In step 1006, a second set of directed edges is determined, each directed edge of the second set extends from a variable node to a third function node of the dependence graph to indicate that a change in the variable associated with the variable node affects the function associated with the third function node. In an embodiment, dependence graph generator 802 analyzes IL representation 418 to determine dependencies between variables and functions. For instance, dependence graph generator 802 may determine when a variable is used by a function, such that changes in the variable affect the function. Thus, dependence graph generator 802 may be configured to parse the structure of each function in IL representation 418 to determine what variables the function uses, if any. Dependence graph generator 802 is configured to identify each variable-function relationship as a "directed edge" (e.g., with an edge identifier) in dependence graph 804. Each directed edge identifies a variable node and a function node, to indicate that the function associated with the function node is dependent on (e.g., uses) the variable associated with the variable node.

In step 1008, a dependence graph is stored that includes the plurality of nodes, the first set of directed edges, and the second set of directed edges. As shown in FIG. 8, dependence graph generator 802 outputs dependence graph 804. Dependence graph 804 may be stored in code information 422 in storage 402, as shown in FIG. 4.

Note that dependence graph generator 802 may generate dependence graph 804 at any time, including at a time at which IL representation 418 is compiled into compiled representation 420 by compilation module 408, at a time prior to generation of revised IL representation 424, or at a time after revised IL representation 424 is generated.

Figure 11:
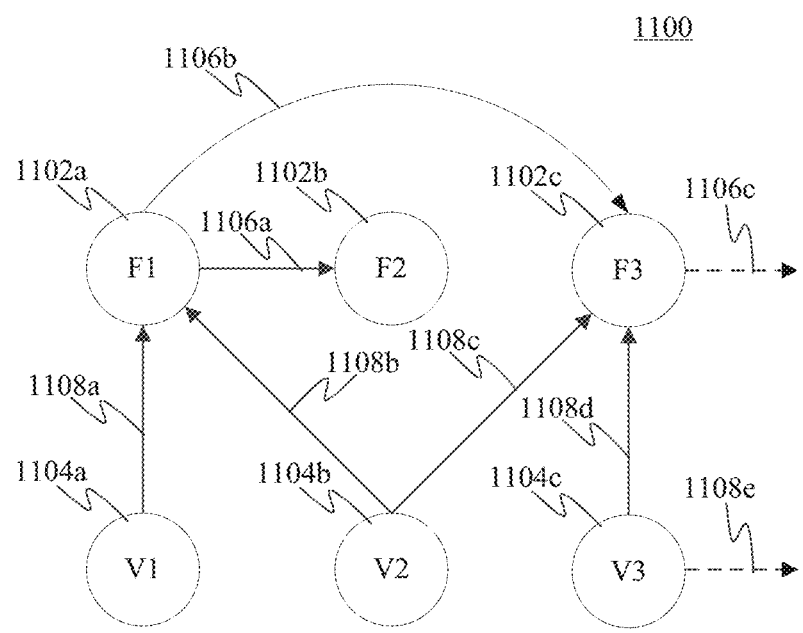
FIG. 11 shows a graphical representation of a portion of an exemplary dependence graph, according to an embodiment.

For illustrative purposes, FIG. 11 shows a graphical representation of a portion of an exemplary dependence graph 1100, according to an embodiment. As shown in FIG. 11, dependence graph 1100 includes nodes and directed edges, including function nodes 1102*a*-1102*c*, variable nodes 1104*a*-1104*c*, and directed edges 1106*a*-1106*c* and 1108*a*-1108*e*. Each of function nodes 1102-1102*c* is associated with a corresponding one of functions F1-F3 included in IL representation 418. Each of variable nodes 1104-1104*c* is associated with a corresponding one of variables V1-V3 included in IL representation 418. Function nodes 1102-1102*c* and variable nodes 1104-1104*c* may be identified by dependence graph generator 802 in step 1002 of flowchart 1000. Three functions and three variables are shown in FIG. 11 for purposes of brevity, and further numbers of functions and variables may be present (as indicated by dotted line directed edges 1106*c* and 1108*e*).

Furthermore, each of directed edges 1106*a*-1106*c* extends from a first function node to a second function node. For instance, directed edge 1106*a* extends from function node 1102*a* to function node 1102*b*, indicating that a change in function F1 associated with function node 1102*a* affects function F2 associated with function node 1102*b* (F2 is dependent on F1). Directed edges 1106*a*-1106*c* may be identified by dependence graph generator 802 in step 1004 of flowchart 1000.

Each of directed edges 1108*a*-1108*e* extends from a variable node to a function node. For instance, directed edge 1108*a* extends from variable node 1104*a* to function node 1102*a*, indicating that a change in variable V1 associated with variable node 1104*a* affects the function F1 associated with function node 1102*a* (F1 is dependent on V1). Directed edges 1108*a*-1108*e* may be identified by dependence graph generator 802 in step 1006 of flowchart 1000.

Continuing the description of step 310 of flowchart 300 (FIG. 3), affected function determiner 414 is configured determine a set of functions present in first source code 110 that are affected by first set of functions 426 and changed variables 428, which may be determined by analysis of code information 422. Affected function determiner 414 may make this determination in any manner.

Figure 9:
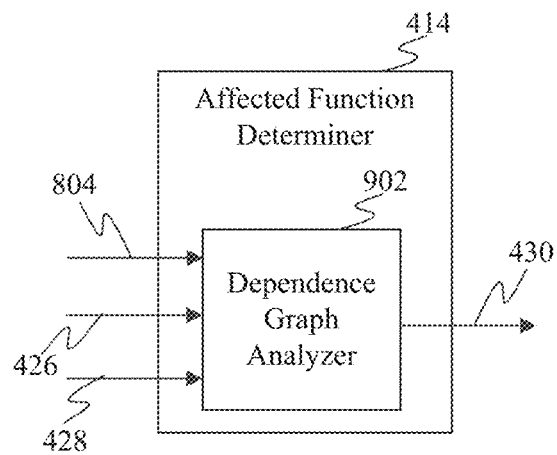
FIG. 9 shows a block diagram of an affected function determiner configured to analyze a dependence graph, according to an example embodiment.

For instance, FIG. 9 shows a block diagram of affected function determiner 414, according to an example embodiment. As shown in FIG. 9, affected function determiner 414 includes a dependence graph analyzer 902. Dependence graph analyzer 902 is configured to analyze dependence graph 804 to determine functions affected by first set of functions 426 and changed variables 428.

Figure 12:
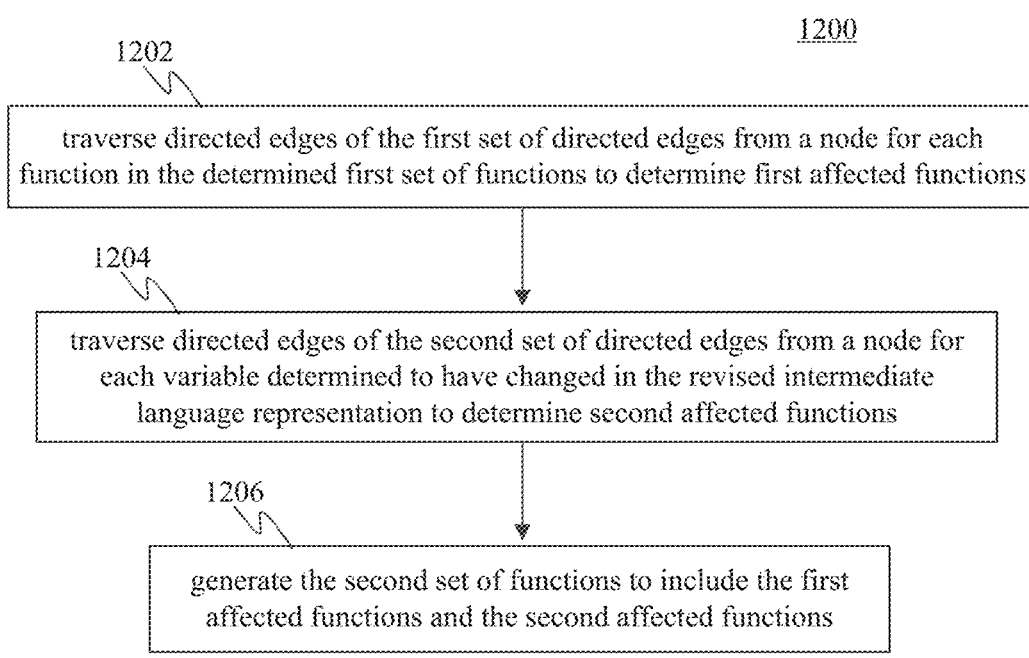
FIG. 12 shows a flowchart providing a process for analyzing a dependence graph, according to an example embodiment.

Dependence graph analyzer 902 may operate in any manner to perform its functions. For instance, FIG. 12 shows a flowchart 1200 providing a process for analyzing a dependence graph, according to an example embodiment. In an embodiment, dependence graph analyzer 902 may operate according to flowchart 1200. Dependence graph analyzer 902 is described with respect to flowchart 1200 for purposes of illustration. Further structural and operational embodiments will be apparent to persons skilled in the relevant art(s) based on the following description of flowchart 1200 and dependence graph analyzer 902. Note that the steps of flowchart 1200 do not necessarily have to occur in the order shown.

Flowchart 1200 of FIG. 12 begins with step 1202. In step 1202, directed edges of the first set of directed edges are traversed from a node for each function in the determined first set of functions to determine first affected functions. In an embodiment, for each function indicated in first set of functions 426, dependence graph analyzer 902 is configured to find the corresponding function node in dependence graph 804. Dependence graph analyzer 902 traverses any directed edges indicated in dependence graph 804 from the function node to determine any (dependent) function node(s). These dependent function nodes are indicated in a set of first affected functions.

For example, with reference to FIG. 11, if function F1 is indicated in first set of functions 426, dependence graph analyzer 902 identifies and traverses directed edges 1106*a* and 1106*b* to function nodes 1102*b* and 1102*c*, respectively, to determine that functions F2 and F3 are dependent on function F1. Functions F2 and F3 are thereby included in the first affected functions.

Referring back to FIG. 12, in step 1204, directed edges of the second set of directed edges are traversed from a node for each variable determined to have changed in the revised intermediate language representation to determine second affected functions. In an embodiment, for each variable indicated in changed variables 428, dependence graph analyzer 902 is configured to find the corresponding variable node in dependence graph 804. Dependence graph analyzer 902 traverses any directed edges indicated in dependence graph 804 from the variable node to determine any (dependent) function node(s). These dependent function nodes are indicated in a set of second affected functions.

For example, with reference to FIG. 11, if variable V1 is indicated in changed variables 428, dependence graph analyzer 902 identifies and traverses directed edge 1108*a* to function node 1102*a*, to determine that function F1 is dependent on variable V1. Function F1 is thereby included in the second affected functions.

In step 1206, the second set of functions is generated to include the first affected functions and the second affected functions. As shown in FIG. 9, dependence graph analyzer 902 generates a second set of functions 430. Second set of functions 430 includes the first affected functions determined by dependence graph analyzer 902 in step 1202, and includes the second affected functions determined by dependence graph analyzer 902 in step 1204. FIG. 4 shows second set of functions 430 output by affected function determiner 414.

Referring back to FIG. 3, in step 312, the first set of functions and the second set of functions are compiled to generate a set of compiled functions. As shown in FIG. 4, compilation module 408 receives first set of functions 426 and second set of functions 430. Compilation module 408 is configured to compile the functions included in first set of functions 426 and second set of functions 430 to generate compiled functions 432. Compilation module 408 may be configured to compile first set of functions 426 and second set of functions 430 in any manner, including according to techniques described elsewhere herein or otherwise known.

In step 314, compiled versions of the first and second sets of functions are replaced in the compiled representation of the source code with the set of compiled functions to generate a compiled representation of the modified source code. As shown in FIG. 4, code assembler 416 of incremental compilation enabler 410 receives compiled representation 420 (of first source code 110) and compiled functions 432. Code assembler 416 is configured to insert compiled functions 432 in compiled representation 420 to generate recompiled machine code 434. In particular, code assembler 416 may be configured to insert compiled functions 432 in compiled representation 420 in place of the functions indicated in first set of functions 426 (functions that were modified by the developer) and second set of functions 430 (functions that were affected by the modified functions of first set of functions 426). In this manner, recompiled machine code 434 is generated as a compiled representation of modified source code 114 without recompiling modified source code 114 in its entirety.

Note that in an embodiment, revised IL representation 424 and recompiled machine code 434 may be stored and subsequently used for incremental compilation. For instance, if modified source code 110 is saved (e.g., in long term storage) as a replacement for first source code 110 (e.g., because the developer wanted to save the changes), revised IL representation 424 and recompiled machine code 434 may also be saved (in long term storage) as the IL representation and machine code version of modified source code 110. Alternatively, the developer may continue to make source code modifications, and may not desire to overwrite first source code 110 with modified source code 114. In this case, modified source code 114, revised IL representation 424, and recompiled machine code 434 may be saved in short term storage (e.g., memory) for use, but later discarded when no longer needed.

Flowchart 300 may be subsequently re-performed when further modifications to source code are received. In such case, the modified and recompiled versions of code generated in the previous iteration of flowchart 300 may be used for the subsequent iterations of incremental compilation. For example, a next modified source code may be received (in step 304) that is a modified version of modified source code 114. In such case, in this next iteration of flowchart 300, modified source code 114 may be considered to be first source code 110, revised IL representation 424 may be stored as IL representation 418, and recompiled machine code 434 may be stored as compiled representation 420 (in step 302). Furthermore, code information 422 may have been generated from revised IL representation 424 (which may be optionally stored as IL representation 418), and thus may be stored and used during this next iteration of flowchart 300 (e.g., in step 310 to determine affected functions). Accordingly, the modified source code received during this next iteration of flowchart 300 may be considered modified source code 114, and recompiled machine code may be generated therefrom in steps 306-314.

B. Example Embodiments for Incremental Compilation for LTCG

Figure 13:
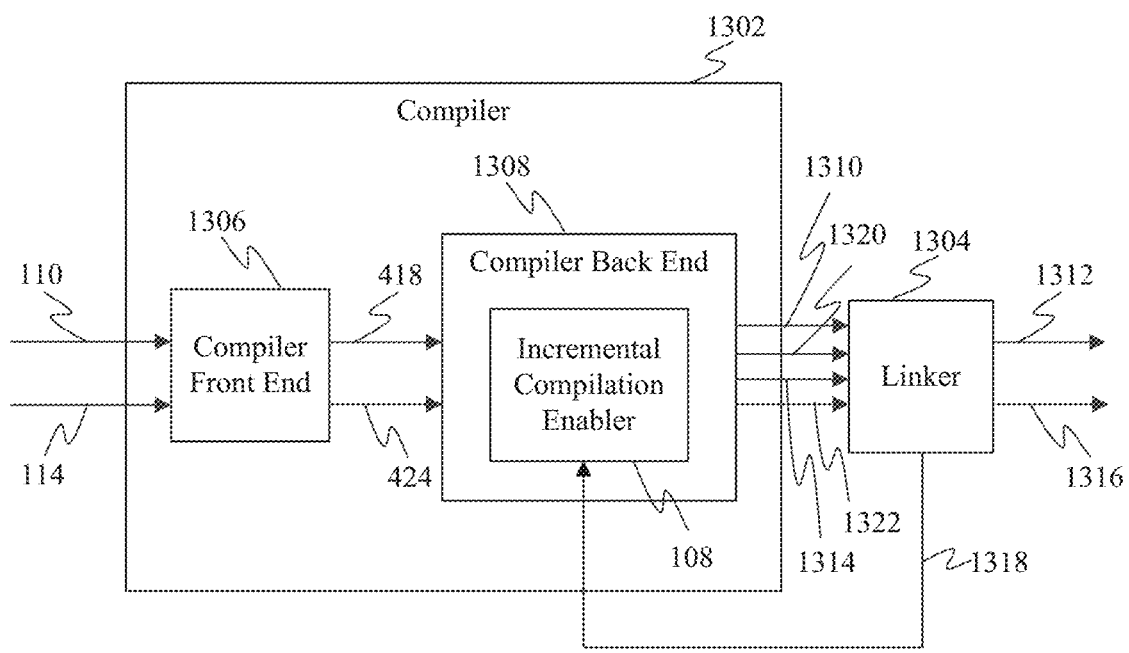
FIG. 13 shows a block diagram of a build system for incremental compilation that includes a complier and a linker, according to an example embodiment.

Note that the embodiments of compilers described herein may be implemented in any type of compile or build configuration, which may or may not include linkers. For instance, FIG. 13 shows a block diagram of a build system 1300 that includes a complier 1302 and a linker 1304, according to an example embodiment. Build system 1300 is configured to perform link time code generation (LTCG), also referred to as whole program optimization. According to LTCG, source code is received in the form of multiple separate source code files. The multiple separate source code files together form a whole program for compilation. All of the source code files are compiled together by build system 1300 to form a single executable. An example of the operation of build system 1300 to perform LTCG is described as follows.

As shown in FIG. 13, compiler 1302 includes a compiler front end 1306 and a compiler back end 1308. Compiler front end 1306 may be configured similarly to compiler front end 404 of FIG. 4, and compiler back end 1308 may be configured similarly to compiler back end 406 of FIG. 4, or they may be configured according to other embodiments. Compiler back end 1308 includes incremental compilation enabler 108. In an embodiment, incremental compilation enabler 108 may be configured similarly to incremental compilation enabler 410 shown in FIG. 4, or may be configured according to another embodiment.

Source code 110 is received by compiler front end 1306 in the form of multiple source code files (e.g., ".c" files, ".cpp" files, etc.). Any number of source code files may be received as source code 110, including numbers of files in the ones, tens, hundreds, thousands, etc. Compiler front end 1306 converts the source code of each source code file into a corresponding IL representation file, thereby generating multiple IL representation files. The IL representation files are output by compiler front end 1306 in IL representation 418. Compiler back end 1308 receives IL representation 418. Compiler back end 1308 determines by a command line switch (e.g., "/GL"), by analysis of information in one or more of the IL representation files, or in another manner, that LTCG is invoked. Due to this, compiler back end 1308 passes the IL representation files to linker 1304 (e.g., packaged in .obj files, or other form) as packaged IL representation files 1310.

Linker 1304 receives packaged IL representation files 1310. Based on determining that IL code is contained in the files of packaged IL representation files 1310, by being invoked by a command line switch (e.g., "/LTCG"), or in another manner, linker 1304 determines that compiler back end 1308 is to be invoked to optimize the IL code across all of the IL representation files (rather than optimizing each IL representation file individually). Accordingly, linker 1304 generates an invocation signal 1318, which is received by compiler back end 1308.

Compiler back end 1308 receives invocation signal 1318, and proceeds to compile the IL representation files together into a single machine code file, which is output by compiler back end 1308 as machine code 1320. Linker 1304 receives machine code 1320, and is configured to generate an executable file 1312, optionally using one or more LIB (library) files, DLL (dynamic-link library) files, etc.

With reference to flowchart 300 FIG. 3, IL representation 418 and machine code 1320 may be stored in storage 402 of FIG. 4 (step 304). Additionally, code information 422 may be generated by compiler front end 404 and/or compiler back end 1308 (e.g., by code analyzer 436 of FIG. 4) and stored in storage 402.

Subsequently, a developer may modify code in one or more of the source code files. The developer may invoke compiler 1302 for an incremental compile (e.g., using a command "-incremental" switch, or otherwise). The modified source code files (including the modified and non-modified source code files) may be received in FIG. 13 as modified source code 114. Compiler front end 1306 may generate revised IL representation 424, which includes an IL representation file for each source code file in modified source code 114. Compiler back end 1308 receives the IL representation files in revised IL representation 424, and passes them to linker 1304 in a similar fashion as described above in revised packaged IL representation files 1314. Linker 1304 receives revised packaged IL representation files 1314, and in response, determines that compiler back end 1308 is to be invoked to optimize the IL code across all of the IL representation files (rather than optimizing each IL file, linker 1304 generates invocation signal 1318 to cause compiler back end 1308 to perform incremental compilation of the revised IL representation files.

Accordingly, compiler back end 1308 receives invocation signal 1318, receives the revised IL representation files, and proceeds to perform incremental compilation according to flowchart 300 of FIG. 3. As described above, only the modified and affected functions of the single machine code file of machine code 1320 are compiled. Note that according to the techniques described above, modified functions and/or variables in one or more IL representation files may be determined. Furthermore, one or more functions that are affected by the modified functions and/or variables may be determined. The affected functions may be present in the same IL representation files as the modified functions and/or variables that affect them, or may be included in different files. For instance, a variable in a first file may affect a function in a second file, or a function in a third file may affect a function in a fourth file. Because dependence graph generator 802 is configured to generate dependence graph 804 based on all of the IL representation files, the affected functions may be found in any of the IL representation files.

The compiled functions are inserted into machine code 1320 (replacing the modified and affected compiled functions) to generate recompiled machine code 1322. Linker 1304 receives recompiled machine code 1322, and is configured to generate an executable file 1316 based thereon.

In this manner, embodiments of incremental compilation may be incorporated in LTCG compilation implementations.

C. Example Embodiments for Incremental Compilation with Inlining

A "callee" function is a function in source code that is called by another function of the source code, referred to as a "caller" function, to be performed. A callee function may be called any number of times by any number of caller functions. In this manner, the code of the callee function is reusable and can be present in the source code once, without having to be duplicated in each of the caller functions.

Note that the embodiments of compilers described herein may be configured to handle incremental compilation with regard to "inlining" of functions. "Inlining" is a compiler optimization where code of a callee function is substituted into the body a caller function during compilation of the source code (in place of the call). As such, inlining has benefits: the runtime overhead of a call instruction can be avoided, because the callee function code can be executed as though it were a part of the caller. Another benefit is that inlining enables more aggressive optimization because the optimizer (e.g., the compiler back end) has call-site specific information when optimizing the body of the inlined caller. So inlining can be an important optimization that affects program performance. Inlining uses heuristics to decide when to inline a callee. Too much inlining can cause a large increase in the size of a machine code binary, which can have negative impact.

In an embodiment, it may be desired for machine code generated from modified source code by an incremental build (e.g., recompiling a portion of the source code that was affected by modifications to the source code according to the embodiments described herein) to be no different from the machine code generated from the modified source code by a full build (recompiling the modified source code entirely from scratch). Such a no-difference outcome can facilitate code testing, to ensure that users do not see a degradation in program performance for incrementally built machine code binaries.

An example of an undesired interaction between incremental compilation and inlining that may affect this no-difference preference is described in the following example scenario: in a full build, a function "foo" may call a function "bar." An inliner module of the compiler may decide not to inline function "bar" into function "foo" because function "bar" may be too large of a code portion (e.g., above a code size threshold limit for inlining). So assuming there are no other dependences indicated in the generated dependence graph (as described above), the dependence graph will not include a dependence edge from "bar" to "foo". Now if an edit to the function "bar" makes the function "bar" much smaller in size, and hence an inline candidate (e.g., having a size below the code size threshold limit for inlining), the machine code generated for the modified source code by an incremental compile would still be functionally correct if we did not re-compile function "foo". However, the machine code for the function "foo" generated by the incremental compile (without the inline) would be different from the machine code generated by a full compile where the code of function "bar" would be inlined into the code of function "foo."

As such, to solve this, in an embodiment, a function having any callees that were re-compiled may be partly recompiled. The partial compile of such functions may be performed after the inlining phase of compilation. An IL representation of source code generated after inlining may be received, and a second checksum may be generated for a function having any callees that were recompiled. The second checksum may be compared with the stored value of the post-inline checksum (generated from the IL representation prior to the modifications). If there is no difference in the checksums, the function may be treated as though it is unaffected. If there is a difference in the checksums, then we continue compiling the function. This enables the no-difference preference to be complied with at a small cost (that of partially compiling some functions).

III. Example Mobile and Stationary Device Embodiments

Computing device(s) 118, development system 100, source code editor 102, compiler 104, execution engine 106, incremental compilation enabler 108, compiler 400, compiler front end 404, compiler back end 406, compilation module 408, incremental compilation enabler 410, code change determiner 412, affected function determiner 414, code assembler 416, code analyzer 436, changed function determiner 502, changed variable determiner 504, dependence graph generator 802, dependence graph analyzer 902, compiler 1302, linker 1304, compiler front end 1306, compiler back end 1308, flowchart 200, flowchart 300, flowchart 600, step 702, flowchart 1000, and flowchart 1200 may be implemented in hardware, or hardware combined with software and/or firmware. For example, development system 100, source code editor 102, compiler 104, execution engine 106, incremental compilation enabler 108, compiler 400, compiler front end 404, compiler back end 406, compilation module 408, incremental compilation enabler 410, code change determiner 412, affected function determiner 414, code assembler 416, code analyzer 436, changed function determiner 502, changed variable determiner 504, dependence graph generator 802, dependence graph analyzer 902, compiler 1302, linker 1304, compiler front end 1306, compiler back end 1308, flowchart 200, flowchart 300, flowchart 600, step 702, flowchart 1000, and/or flowchart 1200 may be implemented as computer program code/instructions configured to be executed in one or more processors and stored in a computer readable storage medium. Alternatively, computing device(s) 118, development system 100, source code editor 102, compiler 104, execution engine 106, incremental compilation enabler 108, compiler 400, compiler front end 404, compiler back end 406, compilation module 408, incremental compilation enabler 410, code change determiner 412, affected function determiner 414, code assembler 416, code analyzer 436, changed function determiner 502, changed variable determiner 504, dependence graph generator 802, dependence graph analyzer 902, compiler 1302, linker 1304, compiler front end 1306, compiler back end 1308, flowchart 200, flowchart 300, flowchart 600, step 702, flowchart 1000, and/or flowchart 1200 may be implemented as hardware logic/electrical circuitry.

For instance, in an embodiment, one or more, in any combination, of development system 100, source code editor 102, compiler 104, execution engine 106, incremental compilation enabler 108, compiler 400, compiler front end 404, compiler back end 406, compilation module 408, incremental compilation enabler 410, code change determiner 412, affected function determiner 414, code assembler 416, code analyzer 436, changed function determiner 502, changed variable determiner 504, dependence graph generator 802, dependence graph analyzer 902, compiler 1302, linker 1304, compiler front end 1306, compiler back end 1308, flowchart 200, flowchart 300, flowchart 600, step 702, flowchart 1000, and/or flowchart 1200 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 14:
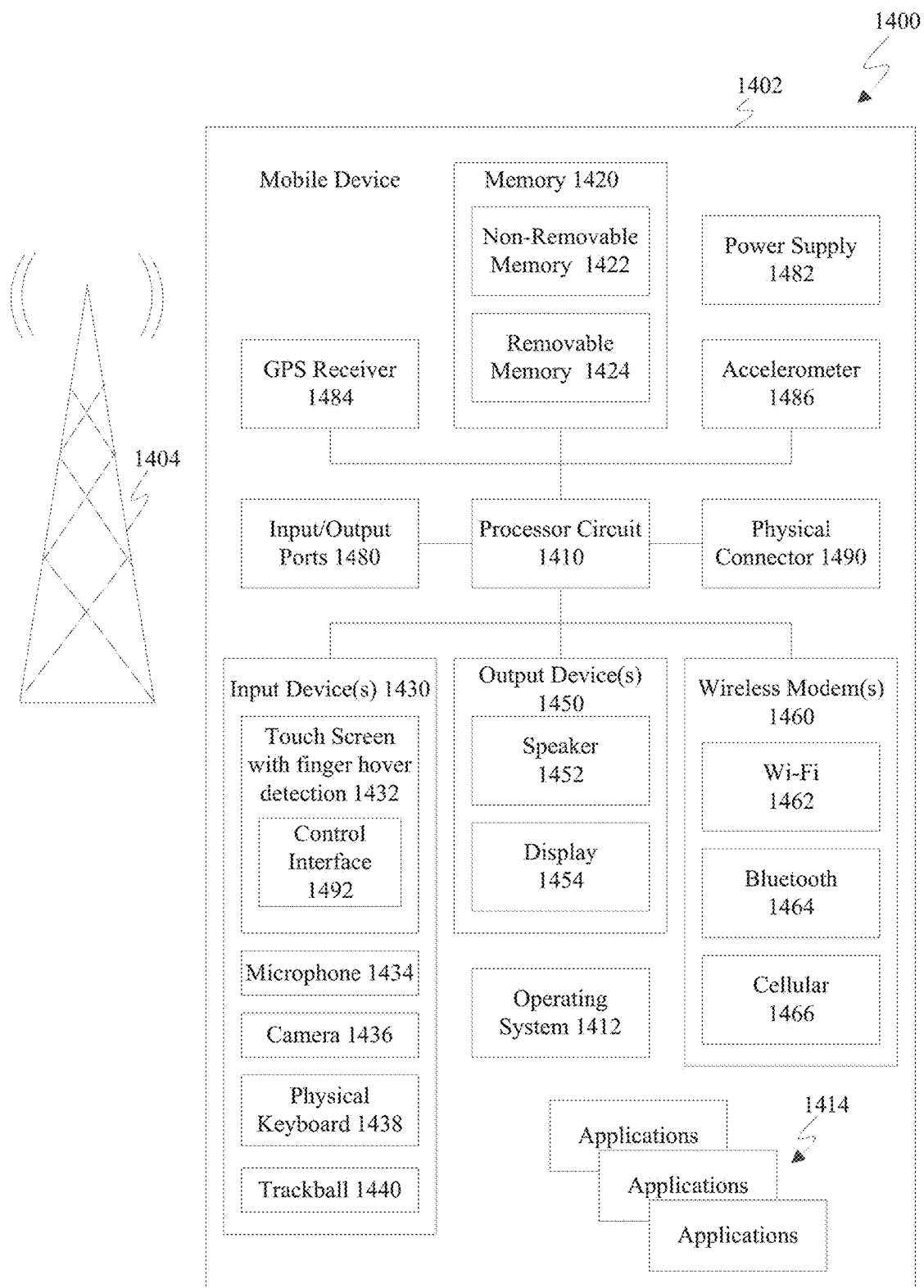
FIG. 14 shows a block diagram of an exemplary user device in which embodiments may be implemented.

FIG. 14 shows a block diagram of an exemplary mobile device 1400 including a variety of optional hardware and software components, shown generally as components 1402. For instance, components 1402 of mobile device 1400 are examples of components that may be included in computing device(s) 118 (FIG. 1) in mobile device embodiments. Any number and combination of the features/elements of components 1402 may be included in a mobile device embodiment, as well as additional and/or alternative features/elements, as would be known to persons skilled in the relevant art(s). It is noted that any of components 1402 can communicate with any other of components 1402, although not all connections are shown, for ease of illustration. Mobile device 1400 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1404, such as a cellular or satellite network, or with a local area or wide area network.

The illustrated mobile device 1400 can include a controller or processor referred to as processor circuit 1410 for performing such tasks as signal coding, image processing, data processing, input/output processing, power control, and/or other functions. Processor circuit 1410 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1410 may execute program code stored in a computer readable medium, such as program code of one or more applications 1414, operating system 1412, any program code stored in memory 1420, etc. Operating system 1412 can control the allocation and usage of the components 1402 and support for one or more application programs 1414 (a.k.a. applications, "apps", etc.). Application programs 1414 can include common mobile computing applications (e.g., email applications, calendars, contact managers, web browsers, messaging applications) and any other computing applications (e.g., word processing applications, mapping applications, media player applications).

As illustrated, mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as "smart cards." The memory 1420 can be used for storing data and/or code for running the operating system 1412 and the applications 1414. Example data can include web pages, text, images, sound files, video data, or other data sets to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1420. These programs include operating system 1412, one or more application programs 1414, and other program modules and program data. Examples of such application programs or program modules may include, for example, computer program logic (e.g., computer program code or instructions) for implementing development system 100, source code editor 102, compiler 104, execution engine 106, incremental compilation enabler 108, compiler 400, compiler front end 404, compiler back end 406, compilation module 408, incremental compilation enabler 410, code change determiner 412, affected function determiner 414, code assembler 416, code analyzer 436, changed function determiner 502, changed variable determiner 504, dependence graph generator 802, dependence graph analyzer 902, compiler 1302, linker 1304, compiler front end 1306, compiler back end 1308, flowchart 200, flowchart 300, flowchart 600, step 702, flowchart 1000, and/or flowchart 1200 (including any suitable step of flowcharts 200, 300, 600, 1000, and 1200), and/or further embodiments described herein.

Mobile device 1400 can support one or more input devices 1430, such as a touch screen 1432, microphone 1434, camera 1436, physical keyboard 1438 and/or trackball 1440 and one or more output devices 1450, such as a speaker 1452 and a display 1454. Touch screens, such as touch screen 1432, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1432 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 1432 is shown to include a control interface 1492 for illustrative purposes. The control interface 1492 is configured to control content associated with a virtual element that is displayed on the touch screen 1432. In an example embodiment, the control interface 1492 is configured to control content that is provided by one or more of applications 1414. For instance, when a user of the mobile device 1400 utilizes an application, the control interface 1492 may be presented to the user on touch screen 1432 to enable the user to access controls that control such content. Presentation of the control interface 1492 may be based on (e.g., triggered by) detection of a motion within a designated distance from the touch screen 1432 or absence of such motion. Example embodiments for causing a control interface (e.g., control interface 1492) to be presented on a touch screen (e.g., touch screen 1432) based on a motion or absence thereof are described in greater detail below.

Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1412 or applications 1414 can comprise speech-recognition software as part of a voice control interface that allows a user to operate the device 1400 via voice commands. Further, device 1400 can comprise input devices and software that allows for user interaction via a user's spatial gestures, such as detecting and interpreting gestures to provide input to a gaming application.

Wireless modem(s) 1460 can be coupled to antenna(s) (not shown) and can support two-way communications between processor circuit 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). Cellular modem 1466 may be configured to enable phone calls (and optionally transmit data) according to any suitable communication standard or technology, such as GSM, 3G, 4G, 5G, etc. At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1400 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components 1402 are not required or all-inclusive, as any components can be not present and other components can be additionally present as would be recognized by one skilled in the art.

Figure 15:
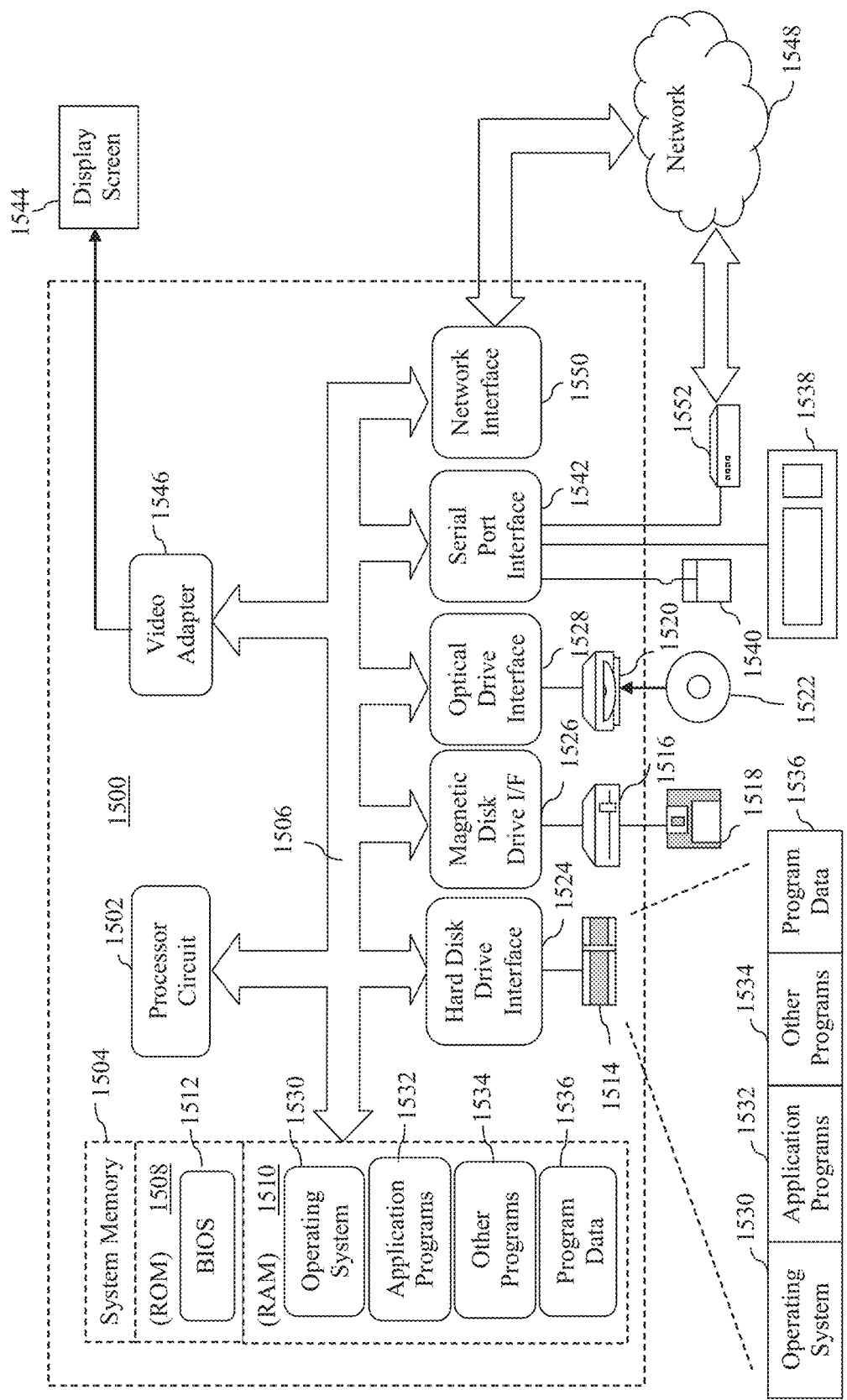
FIG. 15 shows a block diagram of an example computing device that may be used to implement embodiments.

Furthermore, FIG. 15 depicts an exemplary implementation of a computing device 1500 in which embodiments may be implemented. For example, computing device(s) 118 (FIG. 1) may be implemented in one or more computing devices similar to computing device 1500 in stationary computer embodiments, including one or more features of computing device 1500 and/or alternative features. The description of computing device 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1530, one or more application programs 1532, other programs 1534, and program data 1536. Application programs 1532 or other programs 1534 may include, for example, computer program logic (e.g., computer program code or instructions) for implementing development system 100, source code editor 102, compiler 104, execution engine 106, incremental compilation enabler 108, compiler 400, compiler front end 404, compiler back end 406, compilation module 408, incremental compilation enabler 410, code change determiner 412, affected function determiner 414, code assembler 416, code analyzer 436, changed function determiner 502, changed variable determiner 504, dependence graph generator 802, dependence graph analyzer 902, compiler 1302, linker 1304, compiler front end 1306, compiler back end 1308, flowchart 200, flowchart 300, flowchart 600, step 702, flowchart 1000, and/or flowchart 1200 (including any suitable step of flowcharts 200, 300, 600, 1000, and 1200), and/or further embodiments described herein.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to generally refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media (including memory 1420 of FIG. 14). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1542, or any other interface type. Such computer programs, when executed or loaded by an application, enable computing device 1500 to implement features of embodiments discussed herein. Accordingly, such computer programs represent controllers of the computing device 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method comprises: storing a compiled representation and attributes of an intermediate language representation of a first source code; receiving modified source code that is a revised version of the first source code; generating an intermediate language representation of the modified source code; comparing attributes of the revised intermediate language representation and the attributes of the stored intermediate language representation to determine a first set of functions changed in the modified source code relative to the first source code; determining a second set of functions in the first source code affected by one or more functions in the determined first set of functions; compiling the first set of functions and the second set of functions to generate a set of compiled functions; and replacing compiled versions of the first and second sets of functions in the compiled representation of the first source code with the set of compiled functions to generate a compiled representation of the modified source code.

In an embodiment, the comparing attributes of the revised intermediate language representation and the attributes of the stored intermediate language representation to determine a first set of functions changed in the modified source code relative to the first source code comprises: determining a first set of checksums that includes a checksum calculated for each function in the stored intermediate language representation; determining a second set of checksums that includes a checksum calculated for each function in the revised intermediate language representation; and comparing the first set of checksums to the second set of checksums to determine at least one function that changed in the revised intermediate language representation relative to the stored intermediate language representation.

In an embodiment, the method further comprises: comparing attributes of the revised intermediate language representation and the attributes of the stored intermediate language representation to determine any variables changed in the modified source code relative to the first source code; and wherein said determining a second set of functions comprises: determining the second set of functions to include any functions in the first source code affected by at least one of a function in the determined first set of functions or a variable determined to have changed.

In an embodiment, the comparing attributes of the revised intermediate language representation and the attributes of the stored intermediate language representation to determine any variables changed in the modified source code relative to the first source code comprises: comparing variables and associated attributes of the stored attributes of the intermediate language representation to variables and associated attributes of the revised intermediate language representation to determine any changed variables.

In an embodiment, the determining the second set of functions to include any functions in the first source code affected by at least one of a function in the determined first set of functions or a variable determined to have changed comprises: generating a dependence graph based on the first source code; and analyzing the dependence graph to determine the second set of functions.

In an embodiment, the generating a dependence graph based on the first source code comprises: associating a node with each variable and with each function of the intermediate language representation of the first source code to designate a plurality of nodes; determining a first set of directed edges, each directed edge of the first set extends from a first function node to a second function node of the dependence graph to indicate that a change in the function associated with the first function node affects the function associated with the second function node; determining a second set of directed edges, each directed edge of the second set extends from a variable node to a third function node of the dependence graph to indicate that a change in the variable associated with the variable node affects the function associated with the third function node; and storing a dependence graph that includes the plurality of nodes, the first set of directed edges, and the second set of directed edges.

In an embodiment, the analyzing the dependence graph to determine the second set of functions comprises: traversing directed edges of the first set of directed edges from a node for each function in the determined first set of functions to determine first affected functions; traversing directed edges of the second set of directed edges from a node for each variable determined to have changed in the revised intermediate language representation to determine second affected functions; and the second set of functions including the first affected functions and the second affected functions.

In another embodiment, a compiler comprises: a compiler front end configured to generate intermediate language representations of received source code files, including being configured to generate an intermediate language representation of a first source code and of a modified source code that is a revised version of the first source code; a compiler back end configured to generate compiled representations of the intermediate language representations of the received source codes files, including being configured to generate a compiled representation of the first source code and of the intermediate language representation of the modified source code, the compiler back end including an incremental compilation enabler configured to perform incremental compilation, the incremental compilation enabler including a code change determiner configured to determine any variables and a first set of functions changed in the modified source code relative to the first source code, and an affected function determiner configured to determine a second set of functions in the first source code affected by any changed variables and any functions in the changed first set of functions; the compiler back end configured to compile the first set of functions and the second set of functions to generate a set of compiled functions; and the incremental compilation enabler further including a code assembler configured to replace compiled versions of the first and second sets of functions in the compiled representation of the first source code with the set of compiled functions to generate a compiled representation of the modified source code.

In an embodiment, the code change determiner comprises: a changed function determiner configured to: determine a first set of checksums that includes a checksum calculated for each function in the intermediate language representation of the first source code; determine a second set of checksums that includes a checksum calculated for each function in the revised intermediate language representation; and compare the first set of checksums to the second set of checksums to determine at least one function that changed in the revised intermediate language representation relative to the stored intermediate language representation.

In an embodiment, the code change determiner comprises: a changed variable determiner configured to: compare variables and associated attributes of the intermediate language representation of the first source code to variables and associated attributes of the revised intermediate language representation to determine any changed variables.

In an embodiment, the compiler further comprises: a dependence graph generator configured to generate a dependence graph based on the first source code; and wherein the affected function determiner comprises: a dependence graph analyzer configured to analyze the dependence graph to determine the second set of functions.

In an embodiment, the dependence graph generator is configured to: associate a node with each variable and with each function of the intermediate language representation of the first source code to designate a plurality of nodes; determine a first set of directed edges, each directed edge of the first set extends from a first function node to a second function node of the dependence graph to indicate that a change in the function associated with the first function node affects the function associated with the second function node; determine a second set of directed edges, each directed edge of the second set extends from a variable node to a third function node of the dependence graph to indicate that a change in the variable associated with the variable node affects the function associated with the third function node; and store a dependence graph that includes the plurality of nodes, the first set of directed edges, and the second set of directed edges.

In an embodiment, the dependence graph analyzer is configured to: traverse directed edges of the first set of directed edges from a node for each function in the determined first set of functions to determine first affected functions; traverse directed edges of the second set of directed edges from a node for each variable determined to have changed in the revised intermediate language representation to determine second affected functions; and the second set of functions including the first affected functions and the second affected functions.

In another embodiment, a computer-readable storage medium comprises computer-executable instructions that, when executed by a processor, perform a method comprising: storing a compiled representation and attributes of an intermediate language representation of a first source code; receiving modified source code that is a revised version of the first source code; generating an intermediate language representation of the modified source code; comparing attributes of the revised intermediate language representation and the attributes of the stored intermediate language representation to determine a first set of functions changed in the modified source code relative to the first source code; determining a second set of functions in the first source code affected by one or more functions in the determined first set of functions; compiling the first set of functions and the second set of functions to generate a set of compiled functions; and replacing compiled versions of the first and second sets of functions in the compiled representation of the first source code with the set of compiled functions to generate a compiled representation of the modified source code.

In an embodiment, the comparing attributes of the revised intermediate language representation and the attributes of the stored intermediate language representation to determine a first set of functions changed in the modified source code relative to the first source code comprises: determining a first set of checksums that includes a checksum calculated for each function in the stored intermediate language representation; determining a second set of checksums that includes a checksum calculated for each function in the revised intermediate language representation; and comparing the first set of checksums to the second set of checksums to determine at least one function that changed in the revised intermediate language representation relative to the stored intermediate language representation.

In an embodiment, the method further comprises: comparing attributes of the revised intermediate language representation and the attributes of the stored intermediate language representation to determine any variables changed in the modified source code relative to the first source code; and wherein said determining a second set of functions comprises: determining the second set of functions to include any functions in the first source code affected by at least one of a function in the determined first set of functions or a variable determined to have changed.

In an embodiment, the comparing attributes of the revised intermediate language representation and the attributes of the stored intermediate language representation to determine any variables changed in the modified source code relative to the first source code comprises: comparing variables and associated attributes of the stored attributes of the intermediate language representation to variables and associated attributes of the revised intermediate language representation to determine any changed variables.

In an embodiment, the determining the second set of functions to include any functions in the first source code affected by at least one of a function in the determined first set of functions or a variable determined to have changed comprises: generating a dependence graph based on the first source code; and analyzing the dependence graph to determine the second set of functions.

In an embodiment, the generating a dependence graph based on the first source code comprises: associating a node with each variable and with each function of the intermediate language representation of the first source code to designate a plurality of nodes; determining a first set of directed edges, each directed edge of the first set extends from a first function node to a second function node of the dependence graph to indicate that a change in the function associated with the first function node affects the function associated with the second function node; determining a second set of directed edges, each directed edge of the second set extends from a variable node to a third function node of the dependence graph to indicate that a change in the variable associated with the variable node affects the function associated with the third function node; and storing a dependence graph that includes the plurality of nodes, the first set of directed edges, and the second set of directed edges.

In an embodiment, the analyzing the dependence graph to determine the second set of functions comprises: traversing directed edges of the first set of directed edges from a node for each function in the determined first set of functions to determine first affected functions; traversing directed edges of the second set of directed edges from a node for each variable determined to have changed in the revised intermediate language representation to determine second affected functions; and the second set of functions including the first affected functions and the second affected functions.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
generating a first intermediate language representation of a first source code;
generating a compiled representation of the first source code from the first intermediate language representation;
receiving modified source code that is a revised version of the first source code;
generating an intermediate language representation of the modified source code as a second intermediate language representation;
comparing attributes of the second intermediate language representation to attributes of the first intermediate language representation to determine a first set of functions changed in the modified source code relative to the first source code and any variables changed in the modified source code relative to the first source code;
determining a second set of functions in the first source code affected by at least one of
a function in the determined first set of functions, and
any variables determined to have changed; and
compiling the first set of functions and the second set of functions to generate a set of compiled functions to be replacements for the first and second set of functions in the compiled representation of the first source code.

2. The method of claim 1, further comprising:
replacing compiled versions of the first and second sets of functions in the compiled representation of the first source code with the set of compiled functions to generate a compiled representation of the modified source code.

3. The method of claim 1, wherein said comparing comprises:
determining a first set of checksums that includes a checksum calculated for each function in the first intermediate language representation;
determining a second set of checksums that includes a checksum calculated for each function in the second intermediate language representation; and
comparing the first set of checksums to the second set of checksums to determine at least one function that changed in the second intermediate language representation relative to the first intermediate language representation.

4. The method of claim 1, wherein said comparing comprises:
comparing variables and associated attributes of the intermediate language representation to variables and associated attributes of the second intermediate language representation to determine any changed variables.

5. The method of claim 1, wherein said determining comprises:
generating a dependence graph based on the first source code; and
analyzing the dependence graph to determine the second set of functions.

6. The method of claim 5, wherein said generating a dependence graph based on the first source code comprises:
associating a node with each variable and with each function of the first intermediate language representation to designate a plurality of nodes;
determining a first set of directed edges, each directed edge of the first set extends from a first function node to a second function node of the dependence graph to indicate that a change in the function associated with the first function node affects the function associated with the second function node;
determining a second set of directed edges, each directed edge of the second set extends from a variable node to a third function node of the dependence graph to indicate that a change in the variable associated with the variable node affects the function associated with the third function node; and
storing a dependence graph that includes the plurality of nodes, the first set of directed edges, and the second set of directed edges.

7. The method of claim 6, wherein said analyzing the dependence graph to determine the second set of functions comprises:
traversing directed edges of the first set of directed edges from a node for each function in the determined first set of functions to determine first affected functions;
traversing directed edges of the second set of directed edges from a node for each variable determined to have changed in the second intermediate language representation to determine second affected functions; and the second set of functions including the first affected functions and the second affected functions.

8. A computing device, comprising:
at least one processor circuit; and
at least one memory that stores program code configured to be executed by the at least one processor circuit to perform operations, the operations including:
generating a first intermediate language representation of a first source code;
generating a compiled representation of the first source code from the first intermediate language representation;
receiving modified source code that is a revised version of the first source code;
generating an intermediate language representation of the modified source code as a second intermediate language representation;
comparing attributes of the second intermediate language representation to attributes of the first intermediate language representation to determine a first set of functions changed in the modified source code relative to the first source code and any variables changed in the modified source code relative to the first source code;
determining a second set of functions in the first source code affected by at least one of
a function in the determined first set of functions, and
any variables determined to have changed; and
compiling the first set of functions and the second set of functions to generate a set of compiled functions to be replacements for the first and second set of functions in the compiled representation of the first source code.

9. The computing device of claim 8, wherein the operations further comprise:
replacing compiled versions of the first and second sets of functions in the compiled representation of the first source code with the set of compiled functions to generate a compiled representation of the modified source code.

10. The computing device of claim 8, wherein said comparing comprises:
determining a first set of checksums that includes a checksum calculated for each function in the first intermediate language representation;
determining a second set of checksums that includes a checksum calculated for each function in the second intermediate language representation; and
comparing the first set of checksums to the second set of checksums to determine at least one function that changed in the second intermediate language representation relative to the first intermediate language representation.

11. The computing device of claim 8, wherein said comparing comprises:
comparing variables and associated attributes of the intermediate language representation to variables and associated attributes of the second intermediate language representation to determine any changed variables.

12. The computing device of claim 8, wherein said determining comprises:
generating a dependence graph based on the first source code; and
analyzing the dependence graph to determine the second set of functions.

13. The computing device of claim 12, wherein said generating a dependence graph based on the first source code comprises:
associating a node with each variable and with each function of the first intermediate language representation to designate a plurality of nodes;
determining a first set of directed edges, each directed edge of the first set extends from a first function node to a second function node of the dependence graph to indicate that a change in the function associated with the first function node affects the function associated with the second function node;
determining a second set of directed edges, each directed edge of the second set extends from a variable node to a third function node of the dependence graph to indicate that a change in the variable associated with the variable node affects the function associated with the third function node; and
storing a dependence graph that includes the plurality of nodes, the first set of directed edges, and the second set of directed edges.

14. The computing device of claim 13, wherein said analyzing the dependence graph to determine the second set of functions comprises:
traversing directed edges of the first set of directed edges from a node for each function in the determined first set of functions to determine first affected functions;
traversing directed edges of the second set of directed edges from a node for each variable determined to have changed in the second intermediate language representation to determine second affected functions; and
the second set of functions including the first affected functions and the second affected functions.

15. A computing device, comprising:
at least one processor circuit; and
at least one memory that stores program code configured to be executed by the at least one processor circuit to perform operations, the operations including:
generating a first intermediate language representation of a first source code;
generating a compiled representation of the first source code from the first intermediate language representation;
receiving modified source code that is a revised version of the first source code;
generating an intermediate language representation of the modified source code as a second intermediate language representation;
comparing attributes of the second intermediate language representation to attributes of the first intermediate language representation to determine a first set of functions changed in the modified source code relative to the first source and any variables changed in the modified source code relative to the first source code;
determining a second set of functions in the first source code affected by a function in the determined first set of functions and any variables determined to have changed; and
compiling the first set of functions and the second set of functions to generate a set of compiled functions to be replacements for the first and second set of functions in the compiled representation of the first source code.

16. The computing device of claim 15, wherein the operations further comprise:

replacing compiled versions of the first and second sets of functions in the compiled representation of the first source code with the set of compiled functions to generate a compiled representation of the modified source code.

17. The computing device of claim 15, wherein the operations further comprise:
    comparing attributes of the second intermediate language representation and the attributes of the first intermediate language representation to determine any variables changed in the modified source code relative to the first source code; and
    wherein said determining a second set of functions comprises:
        determining the second set of functions to include any functions in the first source code affected by a variable determined to have changed.

18. The computing device of claim 17, wherein said comparing attributes of the second intermediate language representation and the attributes of the first intermediate language representation to determine any variables changed in the modified source code relative to the first source code comprises:
    comparing variables and associated attributes of the intermediate language representation to variables and associated attributes of the second intermediate language representation to determine any changed variables.

19. The computing device of claim 18, wherein said determining comprises:
    generating a dependence graph based on the first source code; and
    analyzing the dependence graph to determine the second set of functions.

20. The computing device of claim 19, wherein said generating a dependence graph based on the first source code comprises:
    associating a node with each variable and with each function of the first intermediate language representation to designate a plurality of nodes;
    determining a first set of directed edges, each directed edge of the first set extends from a first function node to a second function node of the dependence graph to indicate that a change in the function associated with the first function node affects the function associated with the second function node;
    determining a second set of directed edges, each directed edge of the second set extends from a variable node to a third function node of the dependence graph to indicate that a change in the variable associated with the variable node affects the function associated with the third function node; and
    storing a dependence graph that includes the plurality of nodes, the first set of directed edges, and the second set of directed edges.

* * * * *